US012237616B2

(12) United States Patent
Maddens et al.

(10) Patent No.: US 12,237,616 B2
(45) Date of Patent: Feb. 25, 2025

(54) RUGGEDIZED CONNECTOR SYSTEM

(71) Applicant: FCI USA LLC, Etters, PA (US)

(72) Inventors: Koen Maddens, Hofstade (BE); Thierry Goossens, Herdersem (BE); Mithun Hormese Paul, Cochin (IN)

(73) Assignee: FCI USA LLC, Etters, PA (US)

( * ) Notice: Subject to any disclaimer, the term of this patent is extended or adjusted under 35 U.S.C. 154(b) by 0 days.

(21) Appl. No.: 18/352,939

(22) Filed: Jul. 14, 2023

(65) Prior Publication Data

US 2024/0014592 A1 Jan. 11, 2024

Related U.S. Application Data

(63) Continuation of application No. 17/102,207, filed on Nov. 23, 2020, now Pat. No. 11,749,938, which is a (Continued)

(51) Int. Cl.
*H01R 13/52* (2006.01)
*H01R 12/71* (2011.01)
(Continued)

(52) U.S. Cl.
CPC ....... *H01R 13/5219* (2013.01); *H01R 12/716* (2013.01); *H01R 13/502* (2013.01); (Continued)

(58) Field of Classification Search
CPC .............. H01R 13/5219; H01R 12/716; H01R 13/502; H01R 13/5025; H01R 13/52; (Continued)

(56) References Cited

U.S. PATENT DOCUMENTS

| | | | |
|---|---|---|---|
| 3,711,815 | A | 1/1973 | Pierce et al. |
| 6,447,302 | B1 | 9/2002 | Davis |

(Continued)

FOREIGN PATENT DOCUMENTS

| | | |
|---|---|---|
| CN | 102683991 A | 9/2012 |
| CN | 103208698 A | 7/2013 |

(Continued)

OTHER PUBLICATIONS

Chinese Office Action dated Apr. 2, 2021 in connection with Chinese Application No. 201811167433.0.

(Continued)

*Primary Examiner* — Justin M Kratt
(74) *Attorney, Agent, or Firm* — Wolf, Greenfield & Sacks, P.C.

(57) ABSTRACT

An electrical interconnection system with an adapter mounted in an opening within a connector interface of a panel of an electronic enclosure is described. A sealing member may be used to prevent passage of foreign matter, such as liquid, gas or dust particles into the enclosure and into the mating region between the adapter and a mating plug connector. The sealing member may comprise a base and a sidewall configured to wrap around an outer border of the adapter. The sealing member may be configured to form a first sealing interface with the panel, and a second sealing interface with the plug connector. The first and second sealing interfaces may be orthogonal to each other. The sealing member may be made of an elastic material.

22 Claims, 27 Drawing Sheets

Related U.S. Application Data continuation of application No. 16/153,506, filed on Oct. 5, 2018, now Pat. No. 10,847,927.

(60) Provisional application No. 62/629,740, filed on Feb. 13, 2018, provisional application No. 62/597,886, filed on Dec. 12, 2017, provisional application No. 62/568,695, filed on Oct. 5, 2017.

(51) Int. Cl.

| | |
|---|---|
| ***H01R 13/502*** | (2006.01) |
| ***H01R 31/06*** | (2006.01) |
| ***H01R 43/20*** | (2006.01) |
| ***H01R 43/26*** | (2006.01) |
| *H01R 12/72* | (2011.01) |
| *H01R 13/02* | (2006.01) |
| *H01R 13/46* | (2006.01) |
| *H01R 13/504* | (2006.01) |
| *H01R 13/516* | (2006.01) |
| *H01R 13/523* | (2006.01) |
| *H01R 13/73* | (2006.01) |
| *H01R 13/74* | (2006.01) |
| *H01R 24/00* | (2011.01) |
| *H01R 24/60* | (2011.01) |
| *H01R 43/00* | (2006.01) |
| *H01R 43/18* | (2006.01) |
| *H01R 107/00* | (2006.01) |

(52) U.S. Cl.

CPC ......... *H01R 13/5025* (2013.01); *H01R 13/52* (2013.01); *H01R 31/06* (2013.01); *H01R 43/205* (2013.01); *H01R 43/26* (2013.01); *H01R 12/724* (2013.01); *H01R 13/02* (2013.01); *H01R 13/46* (2013.01); *H01R 13/504* (2013.01); *H01R 13/5045* (2013.01); *H01R 13/516* (2013.01); *H01R 13/5202* (2013.01); *H01R 13/5205* (2013.01); *H01R 13/523* (2013.01); *H01R 13/73* (2013.01); *H01R 13/74* (2013.01); *H01R 13/748* (2013.01); *H01R 24/00* (2013.01); *H01R 24/60* (2013.01); *H01R 43/005* (2013.01); *H01R 43/18* (2013.01); *H01R 43/20* (2013.01); *H01R 2107/00* (2013.01)

(58) Field of Classification Search

CPC ...... H01R 31/06; H01R 43/205; H01R 43/26; H01R 12/724; H01R 13/02; H01R 13/46; H01R 13/504; H01R 13/5045; H01R 13/516; H01R 13/5202; H01R 13/5205; H01R 13/523; H01R 13/73; H01R 13/74; H01R 13/748; H01R 24/00; H01R 24/60; H01R 43/005; H01R 43/18; H01R 43/20; H01R 2107/00

See application file for complete search history.

(56) References Cited

U.S. PATENT DOCUMENTS

| | | | | |
|---|---|---|---|---|
| 10,630,021 | B2 | 4/2020 | Shiraishi et al. | |
| 10,847,927 | B2 | 11/2020 | Maddens et al. | |
| 11,749,938 | B2 | 9/2023 | Maddens et al. | |
| 2001/0027037 | A1* | 10/2001 | Kuo | H01R 13/6215 439/76.1 |
| 2007/0111600 | A1 | 5/2007 | Tokunaga | |
| 2007/0184701 | A1 | 8/2007 | Yagome et al. | |
| 2010/0302746 | A1* | 12/2010 | Wing | H05K 1/182 29/829 |
| 2012/0322316 | A1 | 12/2012 | Chen et al. | |
| 2013/0183844 | A1 | 7/2013 | Wang | |
| 2014/0332263 | A1 | 11/2014 | Sone et al. | |
| 2015/0056871 | A1* | 2/2015 | Sasaki | H01R 13/516 439/722 |
| 2016/0233620 | A1* | 8/2016 | Xing | H01R 13/6593 |
| 2016/0233623 | A1 | 8/2016 | Pari | |
| 2017/0033517 | A1 | 2/2017 | Yoshioka et al. | |
| 2017/0294737 | A1 | 10/2017 | Horchler et al. | |
| 2018/0191107 | A1* | 7/2018 | Huang | H01R 13/6608 |
| 2019/0109408 | A1 | 4/2019 | Maddens et al. | |
| 2021/0151929 | A1 | 5/2021 | Maddens et al. | |

FOREIGN PATENT DOCUMENTS

| | | | | |
|---|---|---|---|---|
| CN | 204088733 | U | 1/2015 | |
| CN | 104364977 | A | 2/2015 | |
| CN | 104682079 | A | 6/2015 | |
| CN | 205985558 | U | 2/2017 | |
| CN | 206004057 | U | 3/2017 | |
| CN | 106981767 | A | 7/2017 | |
| CN | 109904687 | A | 6/2019 | |
| DE | 19844603 | A1 | 4/1999 | |
| EP | 0091770 | A2 | 10/1983 | |
| EP | 3156910 | A1 * | 4/2017 | G06F 13/409 |
| JP | 2002-151197 | A | 5/2002 | |
| KR | 101745607 | B1 | 6/2017 | |

OTHER PUBLICATIONS

Chinese Office Action dated Jan. 19, 2022 in connection with Chinese Application No. 201811167433.0.

Extended European Search Report dated Jun. 30, 2021 in connection with European Application No. 18865269.7.

International Search Report and Written Opinion for International Application No. PCT/US2018/054601 mailed Feb. 28, 2019.

* cited by examiner

RUGGEDIZED CONNECTOR SYSTEM

CROSS-REFERENCE TO RELATED APPLICATION

This application is a continuation of U.S. patent application Ser. No. 17/102,207, now U.S. Pat. No. 11,749,938, filed on Nov. 23, 2020, entitled "RUGGEDIZED CONNECTOR SYSTEM," which is a continuation of U.S. patent application Ser. No. 16/153,506, filed on Oct. 5, 2018, entitled "RUGGEDIZED CONNECTOR SYSTEM," which claims priority and the benefit under 35 U.S.C. § 119(e) to U.S. Provisional Patent Application Ser. No. 62/629,740, filed on Feb. 13, 2018, entitled "RUGGEDIZED CONNECTOR SYSTEM." U.S. patent application Ser. No. 16/153,506 also claims priority and the benefit under 35 U.S.C. § 119(e) to U.S. Provisional Patent Application Ser. No. 62/597,886, filed on Dec. 12, 2017, entitled "RUGGEDIZED CONNECTOR SYSTEM." U.S. patent application Ser. No. 16/153,506 also claims priority and the benefit under 35 U.S.C. § 119(e) to U.S. Provisional Patent Application Ser. No. 62/568,695, filed on Oct. 5, 2017, entitled "RUGGEDIZED PLUG CONNECTOR." The entire contents of these applications are incorporated herein by reference in their entirety.

BACKGROUND

This patent application relates generally to interconnection systems, such as those including electrical connectors, used to interconnect electronic assemblies.

Electrical connectors are used in many electronic systems. It is generally easier and more cost effective to manufacture a system as separate electronic assemblies, such as printed circuit boards ("PCBs"), which may be joined together with electrical connectors. Connectors may be used for interconnecting printed circuit boards and for interconnecting other types of devices, such as cables, to printed circuit boards.

Some connectors are designed for use in harsh environments. For example, electrical components mounted in an outdoor enclosure, such as may be used to house cellular communication equipment, may receive power or control signals through a connector. The connector may be mounted in an opening in the enclosure. To protect the equipment inside the enclosure, the connector, when mounted in the opening, should block dust and moisture from entering the enclosure.

SUMMARY

Some embodiments are directed to an adapter connector configured to be mated with a plug connector such that, when mated, the adapter connector and the plug connector are attached to a panel. The adapter connector may comprise an insulative housing, a first plurality of mating contacts supported by the insulative housing, the first plurality of mating contacts being configured to electrically contact a second plurality of mating contacts supported by the plug connector, and a resilient member having first and second sealing elements. The resilient member may be configured to form a first sealing interface with the panel and a second sealing interface with the plug connector, the first and second sealing interfaces being orthogonal to each other. The first sealing element may be configured to engage with the panel and the second sealing element is configured to engage with the plug connector.

In some embodiments, the resilient member comprises a base and a sidewall configured to wrap around an outer border of the adapter connector.

In some embodiments, the first sealing element is disposed at the base and the second sealing element is disposed at the sidewall.

In some embodiments, the first sealing element extends in a direction that is parallel to a direction of mating of the adapter connector with the plug connector.

In some embodiments, the first sealing element comprises a rib configured to engage with a respective recess formed in the panel.

In some embodiments, the second sealing element comprises a rib configured to engage with a respective recess formed in the plug connector.

In some embodiments, the adapter connector is attached to the panel through a plurality of screws.

In some embodiments, the plurality of screws pass through respective openings formed in the resilient member.

In some embodiments, the insulative housing comprises a body having a top surface and an angled surface disposed at an edge of the top surface, and the first plurality of mating contacts extend through the top surface.

In some embodiments, the first sealing elements is positioned to form the first sealing interface with the panel. In some embodiments, the second sealing element is positioned to form the second sealing interface with the plug connector. In some embodiments, the second sealing element has an upper edge. In some embodiments, the upper edge of the second sealing element is below the angled surface.

In some embodiments, the insulative housing comprises a slot and the resilient member comprises a rib extending into the slot, and the slot and the rib each have an aspect ratio of at least 2:1.

Some embodiments are directed to a resilient member configured to seal first and second electrical connectors attached to a panel. The resilient member may comprise a base having an opening formed therethrough, the base being configured to form a first sealing interface with the panel, a sidewall connected to the base, the sidewall being configured to form a second sealing interface with the second electrical connector, a first sealing element extending from the base, and a second sealing element extending from the sidewall. The first sealing interface and the second sealing interface are perpendicular to each other.

In some embodiments, the base, the sidewall, and the first and second sealing elements are made of an elastic material.

In some embodiments, the first sealing element and the sidewall extend in opposite directions.

In some embodiments, the opening is a first opening, and wherein the resilient member further comprises a second opening, wherein the first sealing element is disposed along at least a portion of a perimeter of the second opening.

In some embodiments, the first sealing element comprises a rib configured to engage with a respective recess formed in the panel.

In some embodiments, the second sealing element comprises a rib configured to engage with a respective recess formed in the second electrical connector.

In some embodiments, the resilient member further comprises a third sealing element extending from the base, wherein the first sealing element and the third sealing element form one or more pockets enclosed therebetween.

In some embodiments, the one or more pockets surround the opening in a plane defined by the base.

In some embodiments, the base is further configured to form a third sealing interface with the first connector, and wherein the resilient member further comprises a third sealing element extending from the base, the first and third sealing elements extending in opposite directions.

In some embodiments, the resilient member further comprises a third sealing element extending from the base toward the opening.

Some embodiments are directed to a method for mating a plug connector having a first plurality of mating contacts to an adapter connector having a second plurality of mating contacts. The method may comprise coupling the adapter connector to a resilient member, passing the adapter connector through an opening of a panel, and engaging the plug connector with the adapter connector. When the plug connector is engaged with the adapter connector, the first plurality of mating contacts electrically contact the second plurality of mating contacts, the plug connector is contacts the panel, and the resilient member forms a first sealing interface with the panel and a second sealing interface with the plug connector.

In some embodiments, coupling the adapter connector to the resilient member comprises passing the adapter connector through an opening of the resilient member.

In some embodiments, when the plug connector is engaged with the adapter connector, a first sealing element of the resilient member engages with the panel and a second sealing element of the resilient member engages with the plug connector.

In some embodiments, the first sealing interface and the second sealing interface are perpendicular to each other.

In some embodiments, the method further comprises connecting the plug connector to a cable having a plurality of conductive wires such that the first plurality of mating contacts electrically contact the conductive wires.

In some embodiments, the method further comprises attaching the adapter connector to a printed circuit board.

Some embodiments are directed to a plug connector comprising a cable comprising a plurality of conductive wires; a housing comprising: a first opening configured to receive a portion of a mating connector; a second opening; and at least one third opening between the first opening and the second opening; and a plurality of terminals extending through the at least one third opening, the plurality of terminals comprising mating contact portions extending into the first opening and contact tails extending into the second opening, wherein the plurality of conductive wires of the cable are electrically connected to the contact tails of the plurality of terminals within the second opening; and an insulative material within the second opening encapsulating the contact tails of the plurality of terminals within the second opening and closing off passage between the at least one third opening and the second opening.

Some embodiments are directed to a panel connector configured to be attached to a board connector and to be mated with a plug connector such that, when mated, the panel connector and the plug connector are attached to a panel. The panel connector may comprise an insulative housing comprising a mating interface configured for mating with the plug connector; a mounting interface for mounting to the board connector, the mounting interface comprising a cavity configured to receive a portion of the board connector; one or more projections formed at the mounting interface and configured to slide into respective one or more channels in the board connector; and a first plurality of mating contacts supported by the insulative housing, the first plurality of mating contacts being configured to electrically contact at the mating interface a second plurality of mating contacts supported by the plug connector.

Some embodiments are directed to a panel configured to be attached to a panel connector and to receive thereon a plug connector such that the plug connector electrically contacts the panel connector. The panel may comprise a planar base; an opening formed through the planar base and configured to receive the panel connector therethrough; and a raised portion formed on the planar base and surrounding the opening, the raised portion having a top surface that is vertically offset relative to a top surface of the planar base.

Some embodiments are directed to a panel connector configured to be attached to a board connector and to be mated with a plug connector such that, when mated, the panel connector and the plug connector are attached to a panel. The panel connector may comprise at least one housing portion; an overmolded exterior housing encasing the at least one housing portion; and a first plurality of mating contacts supported by the at least one housing portion, the first plurality of mating contacts being configured to electrically contact a second plurality of mating contacts supported by the plug connector.

Some embodiments are directed to a method for manufacturing a panel connector configured to be attached to a board connector and to be mated with a plug connector such that, when mated, the panel connector and the plug connector are attached to a panel. The method may comprise fabricating at least one housing portion using an insulative material; inserting a plurality of mating contacts in the at least one housing portion; and fabricating an exterior housing by overmolding the at least one housing portion with the plurality of mating contacts inserted therein such that respective ends of the plurality of mating contacts are exposed in an exterior surface of the exterior housing.

Some embodiments are directed to an apparatus comprising an electrical connector having an opening; a plurality of mating contacts inserted through the opening of the electrical connector, each of the plurality of mating contacts having a mating contact portion, a contact tail, and an intermediate portion between the mating contact portion and the contact tail; a contact holder disposed at least partially within the opening of the electrical connector and configured to support the plurality of mating contacts; and a contact cover disposed at least partially within the opening of the electrical connector such that at least one of the plurality of mating contacts is disposed between the contact holder and the contact cover; wherein the intermediate portions comprise first and second sides, and wherein the mating contacts are mounted with the first sides against the contact holder over a first distance from an end of the mating contacts adjacent the contact tails; and the contact cover is mounted with the second sides of the intermediate portions against the contact cover over a second distance from the end of the mating contacts, the second distance being shorter than the first distance, wherein the contact cover comprises one or more projections, and wherein the second sides of the intermediate portions abut the one or more projections over the second distance from the end of the mating contacts, and wherein at least one of the one or more projections comprises a first surface and a second surface opposite the first surface, the first surface being in contact with the second side of the intermediate portion and the second surface being in contact with an inner wall of the opening of the electrical connector.

Some embodiments are directed to an adapter connector configured to be mated with a plug connector such that, when mated, the adapter connector and the plug connector are attached to a panel, the adapter connector comprising an insulative housing, a first plurality of mating contacts supported by the insulative housing, the first plurality of mating contacts being configured to electrically contact a second plurality of mating contacts supported by the plug connector, and a resilient member having first and second sealing elements, the resilient member being configured to form a first sealing interface with the panel and a second sealing interface with the plug connector, the first and second sealing interfaces being orthogonal to each other, wherein the first sealing element is configured to engage with the panel and the second sealing element is configured to engage with the plug connector, wherein the insulative housing comprises a body having a top surface and an angled surface disposed at an edge of the top surface, and wherein the first plurality of mating contacts extend through the top surface.

Some embodiments are directed to a plug connector, comprising a cable comprising a plurality of conductive wires; a housing comprising a first opening configured to receive a portion of a mating connector, a second opening, and at least one third opening between the first opening and the second opening; a plurality of terminals extending through the at least one third opening, the plurality of terminals comprising mating contact portions extending into the first opening and contact tails extending into the second opening, wherein the plurality of conductive wires of the cable are electrically connected to the contact tails of the plurality of terminals within the second opening; and an insulative material within the second opening encapsulating the contact tails of the plurality of terminals within the second opening and closing off passage between the at least one third opening and the second opening, wherein the housing comprises one or more ribs extending into the second opening and placed in contact with an overmold material occupying at least a portion of the second opening.

Some embodiments are directed to a panel connector configured to be attached to a board connector and to be mated with a plug connector such that, when mated, the panel connector and the plug connector are attached to a panel. The panel connector may comprise an insulative housing comprising a mating interface configured for mating with the plug connector; a mounting interface for mounting to the board connector, the mounting interface comprising a cavity configured to receive a portion of the board connector; one or more projections formed at the mounting interface and configured to slide into respective one or more channels in the board connector; and a first plurality of mating contacts supported by the insulative housing, the first plurality of mating contacts being configured to electrically contact at the mating interface a second plurality of mating contacts supported by the plug connector, wherein the first plurality of mating contacts are arranged symmetrically with respect to a first axis that passes through a center of an interface between the panel connector and the board connector, and wherein the one or more projections are arranged asymmetrically with respect to the first axis.

Some embodiments are directed to an electrical connector comprising a housing having an opening formed therethrough and a first rib extending into the opening; a plurality of mating contacts inserted through the opening of the housing; a contact holder disposed at least partially within the opening of the housing and configured to support the plurality of mating contacts, the contact holder comprising a second rib abutting a first wall of the opening; and a contact cover disposed at least partially within the opening of the housing such that at least one of the plurality of mating contacts is disposed between the contact holder and the contact cover, the contact cover comprising a third rib abutting the first wall of the opening; wherein the second and third rib are longitudinally aligned with each other and form a discontinuity between each other, and wherein the first rib is disposed in the discontinuity.

BRIEF DESCRIPTION OF DRAWINGS

The accompanying drawings are not limited to the dimensions shown. For purposes of clarity, not every component may be labeled in every drawing. In the drawings.

DETAILED DESCRIPTION

Figure 1:
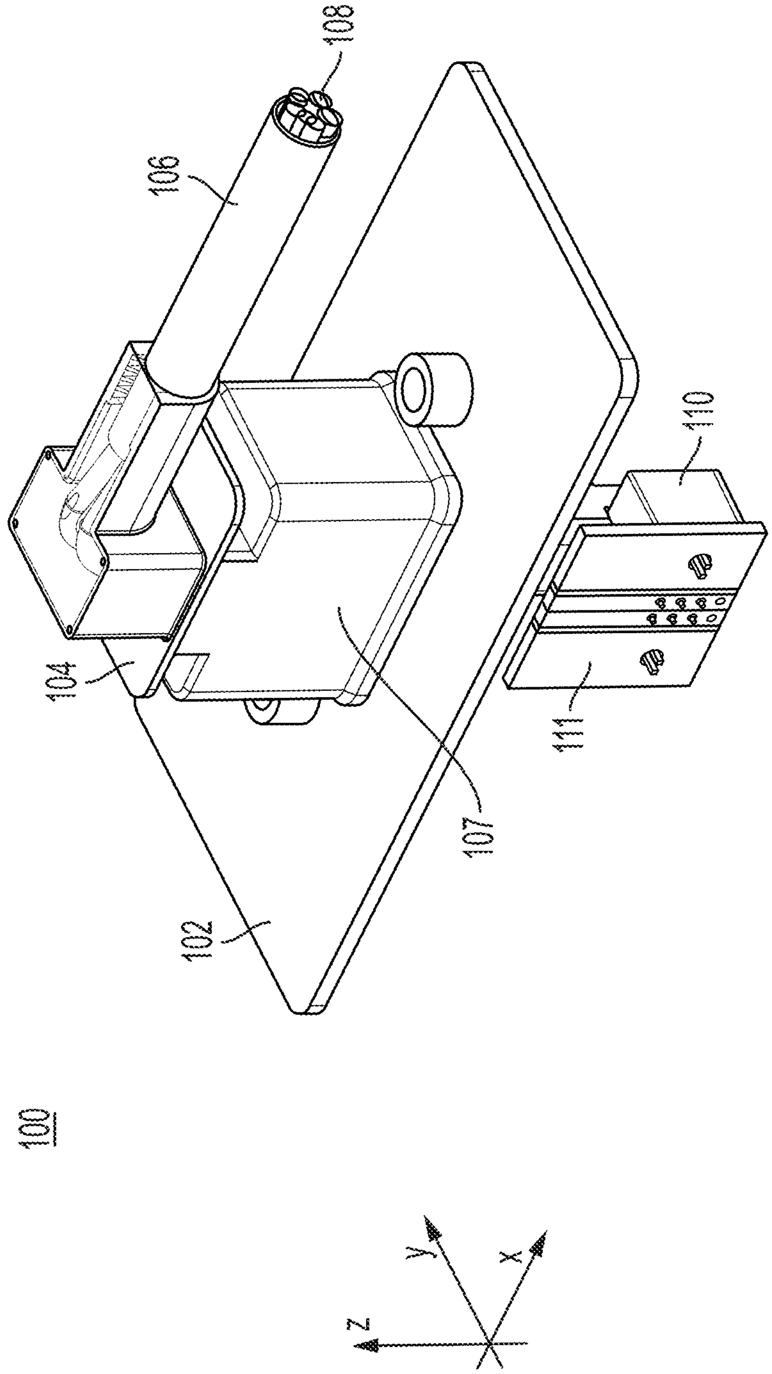
FIG. 1 is an isometric view of an illustrative interconnection system, in accordance with some embodiments.

The inventors have recognized and appreciated techniques for making a rugged, environmentally sealed connector that may be economically manufactured and simply installed. Such a connector may be mounted in a panel opening in an electronic enclosure installed in a harsh environment. For example, the connector may be used to provide power to a fan inside an electronics enclosure housing portions of a communication system that is installed outdoors. The connector may prevent moisture, dust and other environmental contaminants from contaminating the mating contacts of the connector and/or from entering the enclosure.

The inventors have recognized and appreciated that sealing may be enhanced by appropriate selection of the shape and position of seals inserted between two connectors mounted to a panel. In some embodiments, the seals may be arranged to provide three-way sealing. For instance, a single, integral seal may provide sealing at the interfaces formed when three components are assembled together (e.g., a plug connector, a panel connector, and the panel). The seal may be arranged to form a seal between the panel connector and the panel and between the panel connector and the plug connector. In this way, passageways (through which foreign matter may pass) that may otherwise be formed through the panel opening may be prevented. In some embodiments, the seals may comprise one or more ribs configured to mate with respective recesses formed in one of the connectors and one or more ribs configured to mate with respective recesses formed in the panel. The ribs may be sized and arranged to occupy gaps that may otherwise be formed between the connectors, thus hermetically sealing the interior of the connectors where the mating contacts reside. As a result, passage of foreign matter, such as liquid, gas, and dust particles, through these gaps may be prevented (or at least limited) and the integrity of the electrical connections may be preserved.

The inventors have further recognized and appreciated that the contact force between mating contacts in a mated configuration may be adjusted by adjusting the extent to which the plug's mating contact portions are allowed to flex. In some circumstances, it may be desirable to adjust the contact force depending on the environment in which an interconnection system is intended to be used. For example, environments that tend to have mechanical vibrations, such as certain industrial environments, may call for large contact forces (e.g., 1 N or more) to prevent accidental disconnections of the mating contacts.

In some embodiments, the extent to which a mating contact portion is allowed to flex may be set using a contact cover placed in contact with the mating contact portion, such that the position of an end of the contact cover determines the position of a hinge axis of the mating contact portion (that is, the position of an axis about which the mating contact portion can pivot). A reduction in the distance between the end of the contact cover and the mating contact portion may increase the stiffness of the mating contact portions, since a shorter portion of the mating contact portion is allowed to flex. As a result, the force with which the mating contacts are retained is increased. By contrast, an increase in the distance between the end of the contact cover and the mating contact portion may decrease the contact force.

Accordingly, the contact force may be set as desired by appropriately sizing and positioning the contact cover relative to the mating contact portion.

The inventors have further recognized and appreciated that, in some circumstances, it may be desirable to overmold a plug connector to ensure that the cable to which it is connected is reliably secured to it, and/or to insulate conductors that may be exposed at the cable's termination. In this manner, the assembly may be configure to withstand mechanical vibrations that may arise in the environment in which it is deployed. The overmolding may be performed, at least in some embodiments, by injecting a thermoplastic material heated to a fluid into the opening of the plug connector through which the cable is passed.

The injection may be performed once the cable has been assembled with the plug connector. Subsequently, the fluid may be allowed to solidify, thus retaining the cable and the plug connector together. The inventors have appreciated, however, that injecting fluid in the plug connector as described above may cause part of the fluid to reach the mating contacts, which may create an undesired insulating barrier around the mating contacts. The formation of such a barrier may impair the connector's ability to electrically contact a complementary connector or change the flexure of the mating contact portions so that the desired contact force is not achieved in practice. In some embodiments, passage of the fluid may be prevented by blocking the injected portion of the plug connector from the portion in which the mating contacts are positioned.

In some embodiments, blocking may be accomplished by at least partially filling passageways that may otherwise be formed in the plug connector with ribs. In one example, a combination of three ribs may be used for blocking a passageway. Two of such ribs may be longitudinally aligned with one another. The third rib may be aligned with the region where the first two ribs come together, and may fill the discontinuity that may arise between the first two ribs. Such a discontinuity between the first two ribs may arise, for example, due to non-zero manufacturing tolerances. For example, in a connector in which a contact cover may be mounted in any of a number of positions, there may be a gap between the contact cover and other portions of the connector housing. That gap may be filled by the third rib, preventing fluid molding material from passing through the gap.

The inventors have recognized and appreciate that the lifetime of the seals may be greatly increased by preventing foreign matter, such as dust, moist or other particles, from reaching the region where the seals reside. When foreign matter reaches the region where a seal resides and contacts the seal, damage or wearing off of the seal may occur over time. To prevent damage caused by the contact with foreign matter, in some embodiments, the portion of the panel where the seal contacts the panel may be raised. The raised portion, which may be offset from the base of the panel, may form a block against contact of the foreign matter with the seal. In this manner, the foreign matter would have to climb the raised portion, making it significantly less likely that contact with the seal is established. To further protect the raised portion from foreign matter, in some embodiments, the sidewalls of the plug connector's housing may have slanted ends. The slanted ends may be arranged to protect the seal against passage of foreign matter without interfering with the raised portion. For example, the slanted ends may extend outwardly relative to the plug connector's housing.

In some embodiments, one side of the panel connector may be configured to be mated with a plug connector, and another side of the panel connector may be configured to be mated to a board connector, connected to a board. In this way, the panel connector may allow interconnection between a cable positioned on one side of an electronic enclosure formed by the panel with a board positioned on the inside of the enclosure.

The inventors have recognized and appreciated that the engagement of the panel connector with the board connector may be simplified by using guiding structures. In one example, the guiding structure may be formed using projections in the panel connector and channels in the board connector. Accordingly, engagement may be carried out by allowing the projections to slide into the respective channels, thus guiding the panel connector in the proper position. Using structures as described herein may enable a relatively small guiding distance between the board connector and the panel connector. Such a connector system may enable a more compact electronic assembly.

The inventors have further recognized and appreciated that the cost associated with the manufacturing of panel connectors of the types described herein may be reduced by designing the panel connectors to include an inner housing for supporting the mating contacts during overmold and an outer housing for encasing the inner housing. The inventors have recognized that by including an inner housing, in addition to the outer housing, the material needed for the overmold may be limited, thus reducing manufacturing costs. Furthermore, the use of the inner housing may enable a reduction in the amount of material used in the overmold for the formation of the outer housing. Such reduction in the amount of material may be desirable as it may reduce the number and/or size of shrink holes forming inside the outer housing when the molten plastic solidifies. In this respect, the inventors have appreciated that the more material used in the outer housing's walls, the larger the volume the outer housing loses as it cools during the solidification process, and as a result the higher the likelihood that shrink holes are formed. Shrink holes in the outer housing are not desirable as they create points of weakness and/or pockets in which moisture may be trapped. Accordingly, using the inner housing, in addition to the outer housing, results in a reduction in the material for the outer housing.

As a further benefit, the use of the inner housing may limit the number of cut outs in the outer housing (or even completely eliminate the cut outs), including avoiding cut outs which are often formed to maintain the position of the contacts during an insert molding process. In insert molding, plastic is often injected around the contacts at high speed. Given the high speed, the plastic rushing toward the contact may, due to the pressure, displace the contacts from the desired position. To limit contact displacement, molds having projections are often utilized, where the projections pinch and hold the contacts in place while the plastic is being injected. The projections lead to the formation of cut outs in the outer housing, and the projections reach the contacts, during the injection process, through these cut outs. Because precise tooling of molds having projections is costly, cutouts in a molded part, regardless of why they are present, can lead to high costs, with a higher number of projections leading to higher cost of the molds. To limit the cost associated with the formation of projections in the mold, the inventors have appreciated that an inner housing can be used to hold the contacts in place while the plastic is injected. In this way, the mold projections, and as a result the cut outs, can be reduced in number or even eliminated.

FIG. 1 illustrates an interconnection system 100, in accordance with some embodiments. Interconnection system 100 may be used to connect two electronic devices to one another. In some embodiments, interconnection system 100 is used in ruggedized applications (e.g., in industrial applications). Interconnection system 100 may be mounted to panel 102. In some embodiments, panel 102 may include an opening for allowing electrical signals to be passed through the panel. Panel 102 may be an interface provided by a user in some embodiments. For example, panel 102 may be part of (or otherwise be coupled to) the sidewall of an enclosure (e.g., a liquid-containing tank). In this example, interconnection system 100 may be arranged to allow electrical communication between an electronic device placed inside the tank (e.g., a sensor) and other electronic devices placed outside the tank. Panel 102 and interconnection system 100 may be arranged to block passage of foreign matter, such as liquid, gas, or dust particles, from one side of panel 102 to the other and/or to prevent foreign matter from depositing on the mating contacts.

In the example of FIG. 1, interconnection system 100 is arranged to deliver signals between cable 106, which includes conductive wires 108, to circuit board 111. Circuit board 111 may include one or more electronic devices mounted thereon. Of course, interconnection system 100 is not limited to this arrangement. For example, other embodiments may not use cables and may connect two printed circuit boards (or other type of devices) to one another with conductors that are not part of a cable. In an alternative example, interconnection system 100 may be used to connect a cable to another cable.

As illustrated, cable 106 passes through an opening formed in a housing (107) of a plug connector 104 and is terminated in the plug connector 104 such that is it in electrically connected to contacts placed in the plug connector. Plug connector 104 may be mounted to one side of panel 102. Positioned at the other side of panel 102 may be a board connector 110. In some embodiments, board connector 110 may be mounted to panel 102 via panel connector 130 (also referred to as "panel adapter" or "adapter connector"). While board connector 110 is illustrated such that printed circuit board 111 is substantially perpendicular to panel 102, other configurations are also possible. For example, in other embodiments, board connector 110 may be arranged such that printed circuit board 111 is parallel to panel 102. In yet other embodiments, board connector 110 may be arranged such that printed circuit board 111 is neither parallel nor perpendicular to panel 102.

Figure 2:
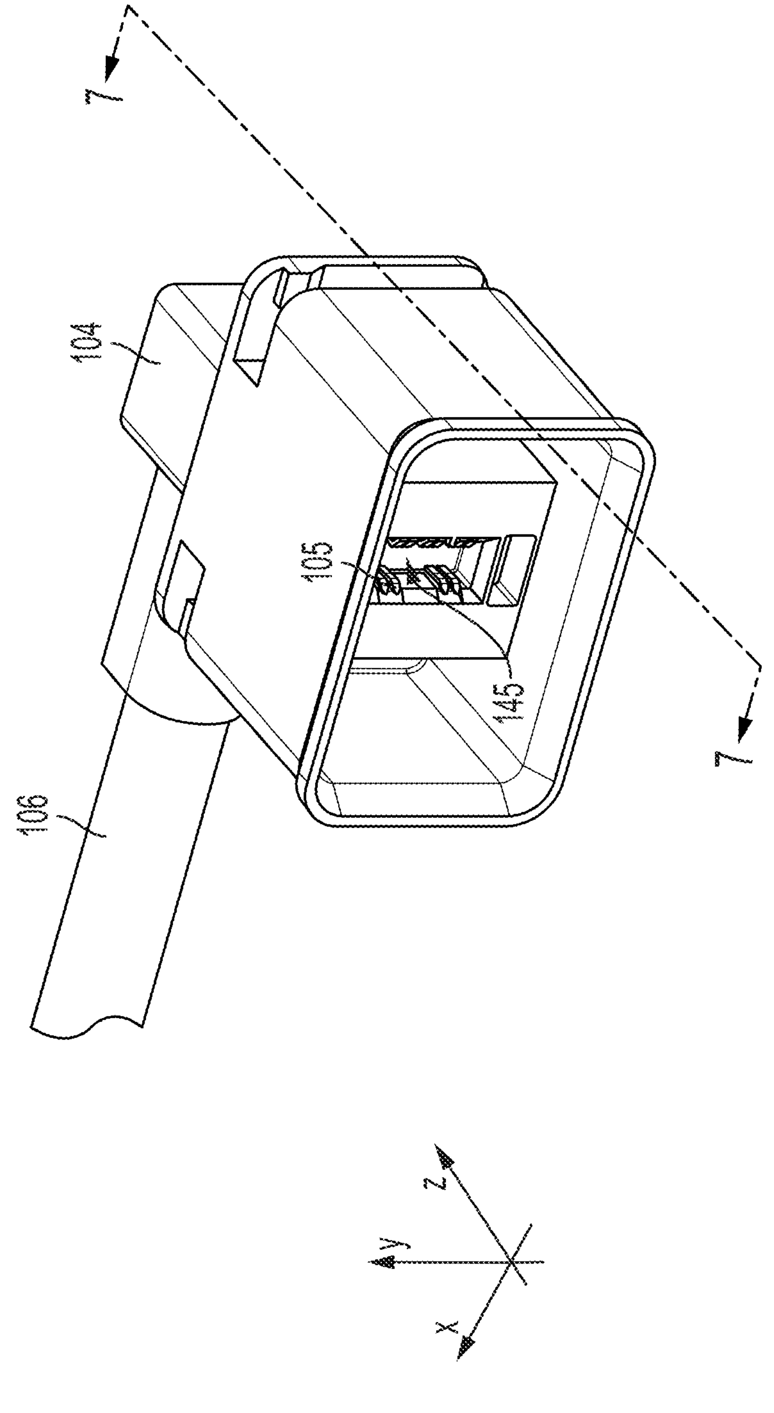
FIG. 2 is an isometric view of an illustrative plug connector, in accordance with some embodiments.

FIG. 2 shows the illustrative plug connector 104 of the example of FIG. 1 when not mounted to panel 102, in accordance with some embodiments. Plug connector 104 includes an opening 145, which may be arranged to allow passage of mating contacts therethrough. FIG. 2 illustrates a plurality of mating contacts 105 (also referred to herein as "terminals") passing through the opening 145. Mating contacts 105 may be electrically connected to conductive wires 108 of cable 106 (not visible in FIG. 2). Opening 145 may be shaped and sized to receive a mating element therein. The mating element may include mating contacts configured to electrically connect to mating contacts 105 when the interconnection system 100 is in the mated configuration. As such, opening 145 may serve as a receptacle.

Figure 3B:
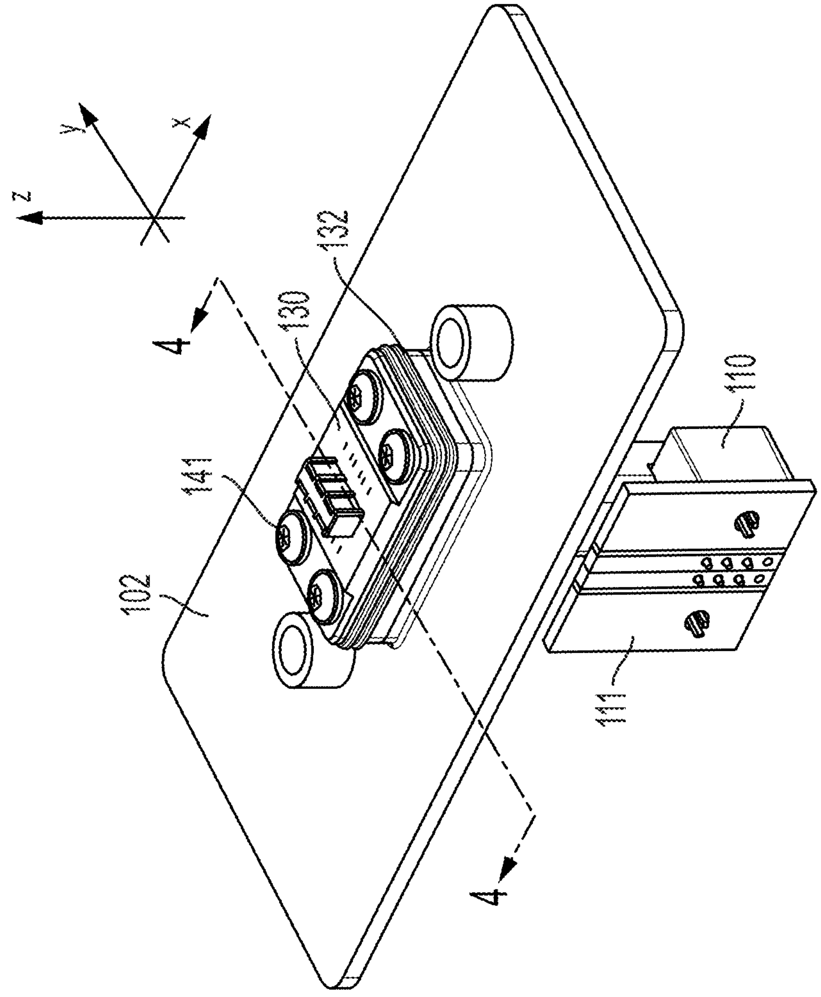
FIG. 3B is an isometric view of the panel connector of FIG. 3A when mounted to a panel of an enclosure, in accordance with some embodiments.
Figure 3A:
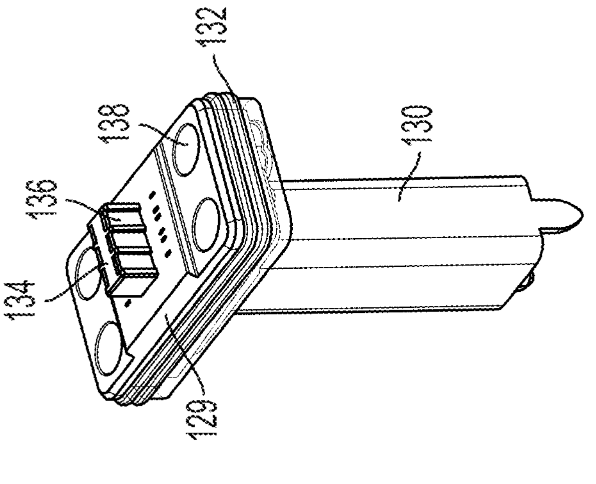
FIG. 3A is an isometric view of an illustrative panel connector, in accordance with some embodiments.

An example of such a mating element is depicted in FIGS. 3A-3B, which illustrates panel connector 130 and mating contacts 136. As illustrated, in this configuration panel connector 130 is configured to support mating contacts 136. This support may be formed, at least in some embodiments, by overmolding mating contacts 136 with plastic. In some embodiments, panel connector 130 includes a projection 134 extending away from the panel connector's body. Projection 134 supports the ends of mating contacts 136. Projection 134 may be shaped and size to fit, at least partially, into opening 145 (shown FIG. 2) such that mating contacts 136 electrically contact mating contacts 105. Mating contacts 105 may be configured as beams and the mating contacts of the panel connector may be configured as pads (though the opposite arrangement is also possible). While in this configuration plug connector 104 includes a receptacle and panel connector 130 forms a mating element (through projection 134), the opposite configuration is also possible.

Figure 5A:
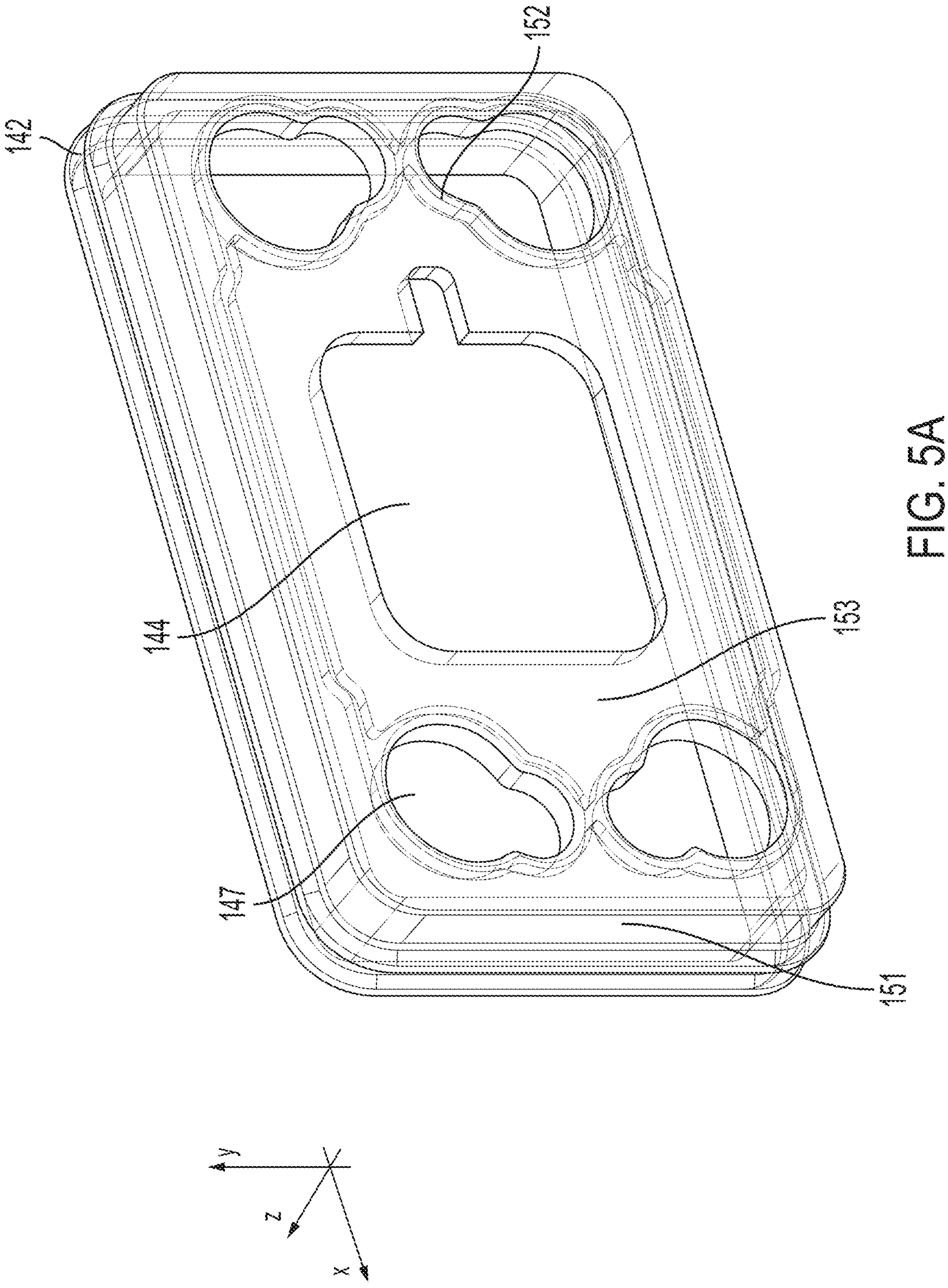
FIG. 5A is an isometric view of an illustrative seal, in accordance with some embodiments.

In some embodiments, a seal 132 is used to hermetically seal mating contacts 136 and 105 from the external environment. Seal 132 may be arranged to prevent passage of foreign matter through gaps that may otherwise be formed between plug connector 104 and panel connector 130 and/or through gaps that may otherwise be formed between panel 102 and panel connector 130. In some embodiments, seal 132 may include a portion configured to skirt around the outer border of the panel connector, as will be described further below. Panel connector 130 may be mounted to panel 102 via attaching mechanisms 141, which may be implemented, at least in some embodiments, using screws. In one example, as illustrated in FIG. 3B, four screws are used. The screws may be spaced to provide even pressure on the panel. In at least some of the embodiments in which the attaching mechanisms are screws, panel connector 130 may include openings 138 for allowing passage of respective screws. Similarly, seal 132 may include openings (as shown in FIG. 5A) for allowing passage of the screws.

In some embodiments, the top surface of panel connector 130's body may include a slanted region arranged to cause dust, moisture or other foreign matter to slide off to the side of the panel connector. In the embodiment of FIG. 3A, for example, an angled surface 129 is formed at the edge of the top surface of panel connector 130's body. In this way, if dust, moisture or other foreign matter inadvertently infiltrates the region where the mating contacts are positioned, the angled surface may cause the foreign matter to slide off the panel connector. Alternatively or additionally, as shown in FIG. 3A, the upper edge of seal 132 is below that top surface such that seal 132 does not trap foreign matter. In the embodiment illustrated the upper edge of seal 132 is below angled surface 129.

Figure 4B:
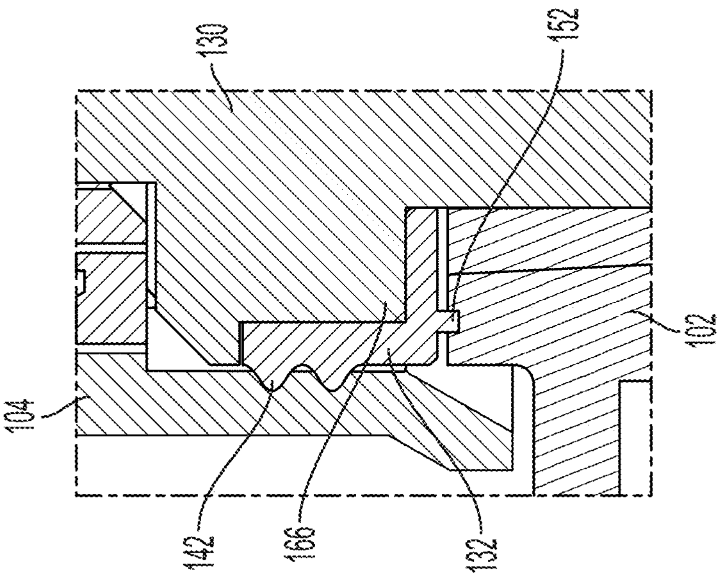
FIG. 4B illustrates a portion of the cross sectional view of FIG. 4A in additional detail, in accordance with some embodiments.
Figure 4A:
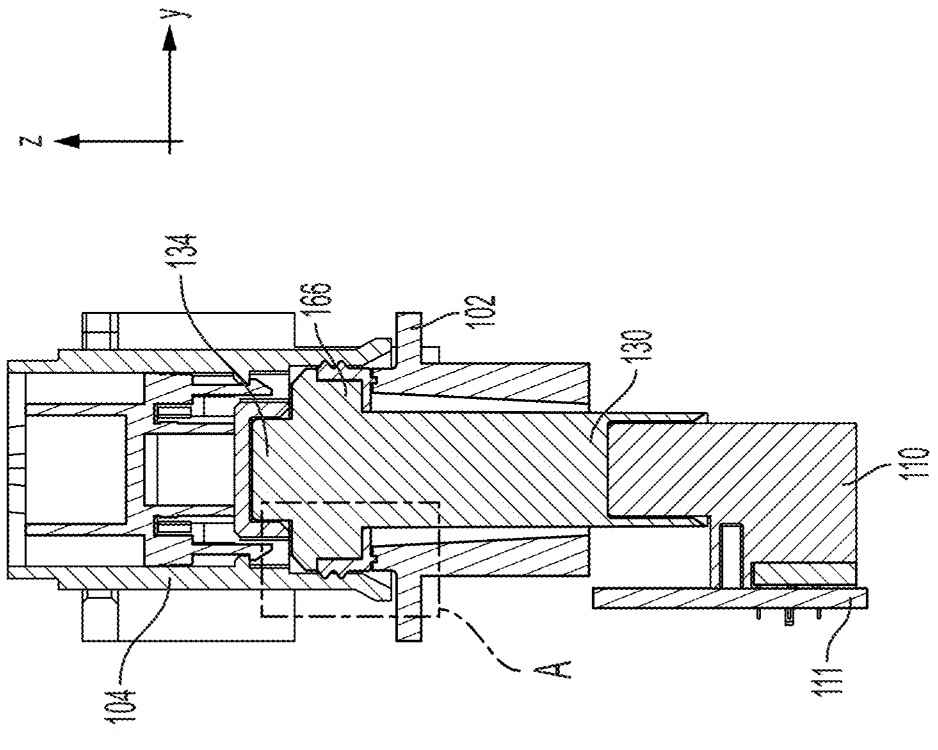
FIG. 4A is a cross section of the interconnection system of FIG. 1, taken along the 4-4 line in FIG. 3B, in accordance with some embodiments.

FIG. 4A is a cross sectional view of the illustrative interconnection system 100 of the example of FIG. 1 in the mated configuration (that is, when mating contacts 105 are connected to mating contacts 136), in accordance with some embodiments. As illustrated, in this configuration projection 134 fits, at least partially, within opening 145. Plug connector 104 and panel connector 130 may be connected to panel 102. FIG. 4B illustrates a portion (labeled "A") of FIG. 4A in additional detail. As described above, a seal 132 may be used to prevent passage of foreign matter. Seal 132 may be made form an elastic material, such as polymer or rubber. Seal 132 may include one or more sealing elements 142 for sealing gaps between the plug connector 104 and the panel connector 130. In some embodiments, sealing elements 142 include ribs, which may be configured to mate with recesses formed in plug connector 104. The ribs and the recesses may have any suitable shape and size. Alternatively, or additionally, ribs may be formed on plug connector 104 and recesses may be formed in seal 132. Mating of the ribs with respective recesses may ensure that the position of seal 132 relative to plug connector 104 is maintained over time.

In some embodiments, seal 132 may include one or more sealing elements 152 for sealing gaps between the plug connector 104 and the panel 102, and/or panel connector 130 and panel 102. As described in connection with sealing elements 142, sealing elements 152 may include ribs, which may be configured to mate with recesses formed in panel 102 (though the opposite arrangement is also possible). The ribs may extend along the z-axis, thereby forming a skirt. Mating of the ribs with respective recesses may ensure that the position of seal 132 relative to panel 102 is maintained over time.

In some embodiments, seal 132 may include a base and a sidewall extending away from the base (along the z-axis) and configured to wrap around an outer border 166 of panel connector 130.

In some embodiments, the plug connector 104 may have a surface forming a seal with a first surface of the seal 132 (thus forming a first sealing interface) and the panel 102 may have a surface forming a seal with a second surface of the seal 132 (thus forming a second sealing interface). In some embodiments, the first and second sealing interfaces are orthogonal to one another. In the example illustrated in FIG. 4A, the sealing interface between the plug connector 104 and the seal 132 is parallel to the z-axis, and the sealing interface between the panel 102 and the seal 132 is parallel to the y-axis. It should be appreciated, however, that other arrangements are also possible.

It should be appreciated that seal 132 may include sealing elements 142 only, sealing elements 152 only, or both sealing elements 142 and 152. When seal 132 is used as described herein, passage of foreign matter inside the cavity formed between plug connector 104 and panel 102 may be prevented (or at least limited). In this way, the integrity of the electrical contacts may be preserved and/or the lifetime of the interconnection system may be lengthened.

Figure 4D:
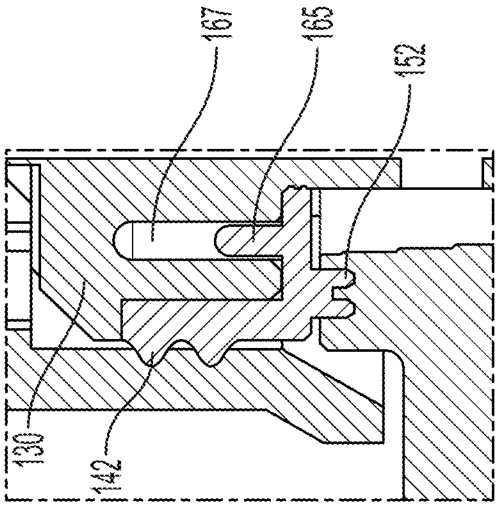
FIG. 4D illustrates a portion of the cross sectional view of FIG. 4C in additional detail, in accordance with some embodiments.
Figure 4C:
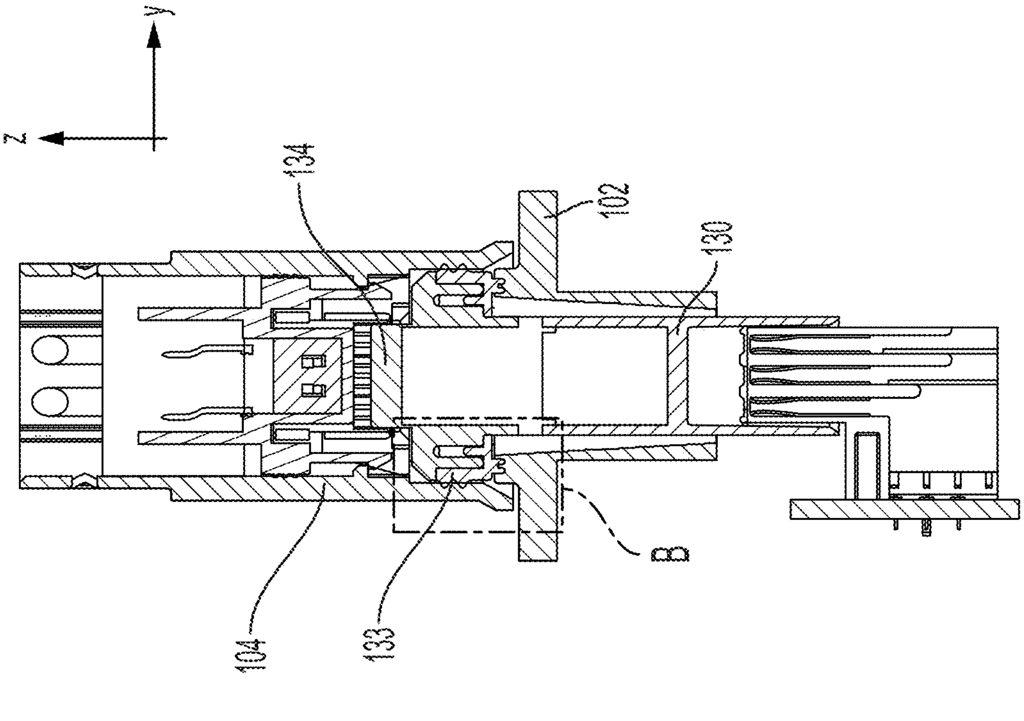
FIG. 4C is a cross sectional view of another interconnection system, in accordance with some embodiments.

FIG. 4C is a cross sectional view of another interconnection system, in accordance with some embodiments. In this arrangement, seal 133, in addition to sealing elements for engaging with plug connector 104 and panel 102, includes sealing elements for engaging with panel connector 130. FIG. 4D illustrates a portion (labeled "B") of FIG. 4C in additional detail. As illustrated, seal 133 includes sealing elements 142 and 152 (as in the embodiment of FIGS. 4A-4B). In addition, seal 133 includes sealing element 165 arranged to engage with panel connector 130. In this example, panel connector includes a recess 167 and sealing element 165 is a rib adapted to fit into recess 167, though the opposite arrangement is also possible. In this manner, an additional barrier obstructing passage of foreign matter is formed. The embodiment of FIGS. 4C-4D is arranged such that the sealing interface formed between seal 133 and panel connector 130 is parallel to the sealing interface between seal 133 and panel 102. As further illustrated, sealing elements 165 and 152 extend from the base of seal 133 in opposite direction (sealing elements 165 extending away from panel 102 and sealing elements 152 extending toward panel 102). However, not all embodiments are limited to having these sealing interface parallel to one another.

Figure 4F:
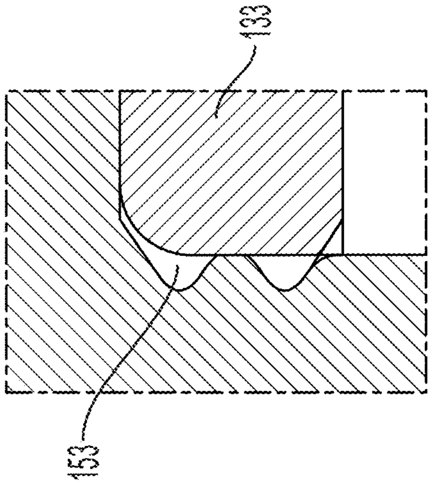
FIG. 4F is an enlarged cross sectional view of the portion labeled C in FIG. 4E in additional detail, in accordance with some embodiments.
Figure 4E:
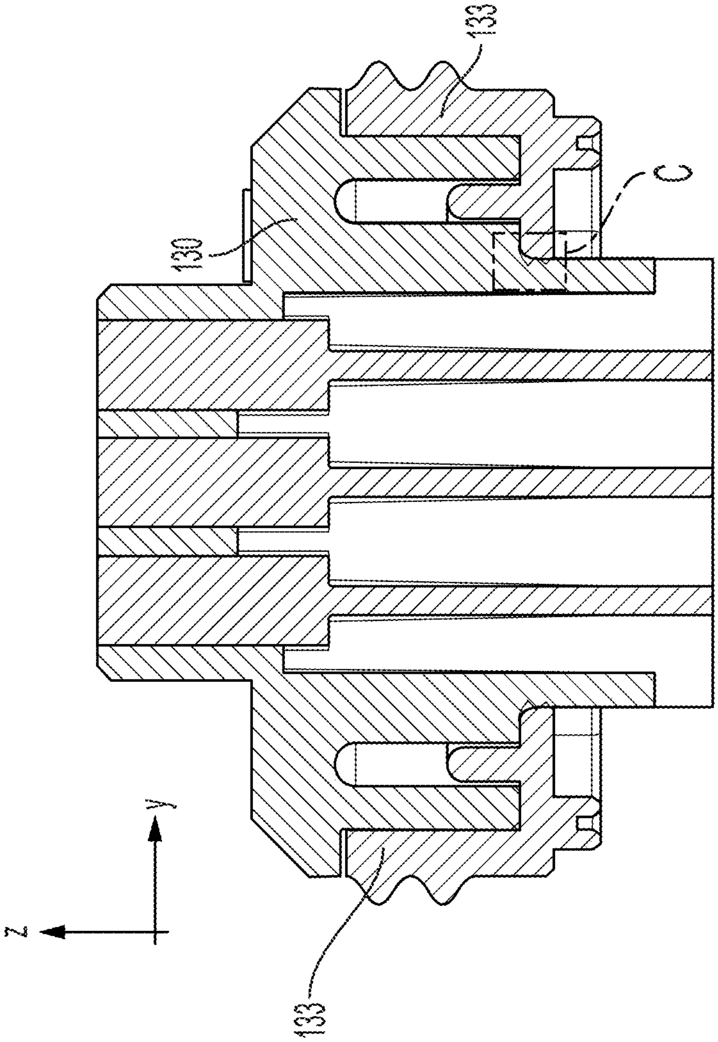
FIG. 4E is a cross sectional view of another interconnection system, in accordance with some embodiments.

In some embodiments, as further illustrated in FIGS. 4E-4F, seal 133 may include ribs extending towards the opening formed in the seal for passage of the panel connector 130. These ribs, labeled 135, are illustrated in FIG. 4F, which illustrates portion C of FIG. 4E in additional detail. Ribs 135 may be sized and positioned to engage with recesses formed in panel connector 130. Ribs 135 may extend along the y-axis direction. Engagement of ribs 135 with the panel connector's recesses may further prevent passage of foreign matter.

An example of a seal in accordance with some embodiments is depicted in FIG. 5A. The seal (referred to also as "resilient member") may be made of a resilient material (e.g., a polymer). In this configuration, the seal includes an opening 144 for allowing passage of the panel connector 130, and openings 147 for allowing passage of attaching mechanisms 141. In some embodiments, the seal includes a base 153 and a sidewall 151. The sidewall may extend away from the base 153 (parallel to the z-axis) along the perimeter of base 153 (or at least a portion of the perimeter). In the mated configuration, the inner surface of the sidewall may be arranged to face panel connector 130 and the outer surface of the sidewall may be arranged to face the plug connector 104. In some embodiments, sidewall 151 may be arranged to wrap around the outer border 166 (shown in FIGS. 4A-4B) of panel connector 130.

In some embodiments, sealing elements 142 are formed around the sidewall 151. For example, in at least some of the embodiments in which the sealing elements 142 include ribs, the ribs may extend away from sidewall 151 (parallel to the y-axis or the x-axis). In some embodiments, sealing elements 152 are formed on the base 153. For example, in at least some of the embodiments in which the sealing elements 152 include ribs, the ribs may extend away from base 153 (parallel the z-axis), thereby forming a skirt. In some embodiments, such ribs may extend opposite the direction along which sidewall 151 extends. In some embodiments, sealing elements 152 are formed along the perimeter of respective openings 147. In some embodiments, a sealing element 152 is formed along the perimeter, or at least a portion thereof, of opening 144. In some embodiments, though not visible in FIG. 5A, seal 132 may include one or more sealing elements 165 for sealing the surface between the seal and panel connector 130. Sealing elements 165 may be ribs, in some embodiments, extending in the opposite direction relative to sealing elements 152. Connector may have slots positioned to receive the ribs extending from seal 132. Each slot may be sized and positioned to snugly receive a corresponding rib. The ribs may be sized such that the distance the rib extends into the corresponding slot is a multiple of its width. The aspect ratio of length to width may be for example greater than 1:1 or, in some embodiments, greater than 2:1 or greater than 3:1.

Figure 5C:
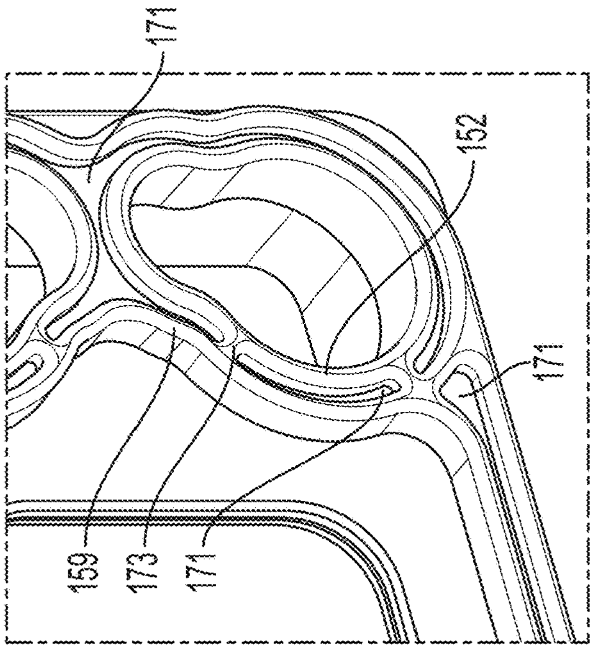
FIG. 5C is an enlarged isometric view of the portion of the seal labeled D in FIG. 5B in additional detail, in accordance with some embodiments.
Figure 5B:
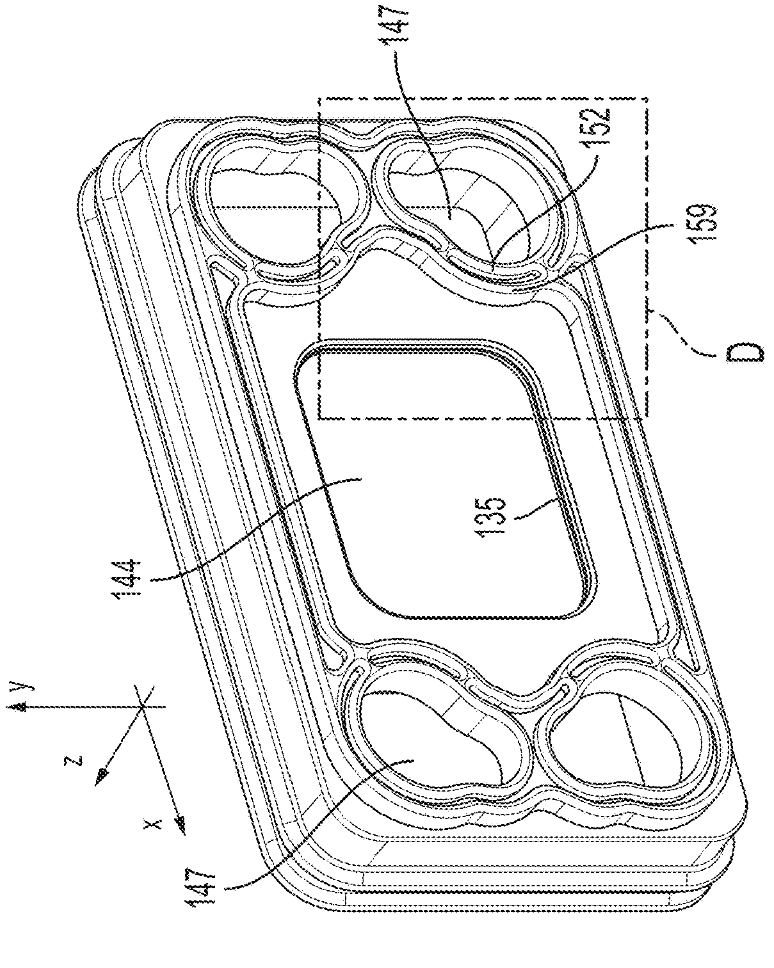
FIG. 5B is an isometric view of an alternative illustrative seal, in accordance with some embodiments.

FIG. 5B illustrates another seal that may be used in connection with the arrangements of FIG. 4C-4F, or with any other suitable arrangement, in accordance with some embodiments. In this case, the seal includes multiple sets of sealing elements (e.g., ribs) for sealing the surface between the seal and panel 102. For example, as illustrated in FIG. 5B, sealing element 152 may be an inner sealing element enclosed within an outer sealing element 159. As further illustrated in FIG. 5C, which illustrate the portion labeled D of FIG. 5B in additional detail, sealing elements 152 and 159 may be arranged such that one or more pockets 171 are formed between them. The pocket(s) may be arranged to surround the perimeter of openings 144 and 147 in the xy-plane.

In some embodiments, pocket(s) 171 may serve as watertight compartments. For example, if dust, moisture, or other foreign matter, inadvertently infiltrates between the panel and the seal (which in some circumstances may occur if the seal in not properly aligned to the panel), at least part of the moisture may be trapped in the pocket(s), thereby reducing the likelihood that the moisture penetrates through openings 147 and/or 144 and reaches the mating contacts. In this manner, sealing elements 152 and 159 may provide a double barrier against passage of moisture or other foreign matter.

Of course, more than two sealing elements may be provided in some embodiments, thus forming additional pockets. As illustrated in FIG. 5C, the pockets may be separated by bridges 173, where sealing element 152 meets sealing element 159, though in another embodiments, a single continuous pocket may be formed. Further illustrated in FIG. 5B are ribs 135 (described in connection with FIG. 4F), which extends into opening 144 and may be configured to engage with recesses formed in the panel connector.

Figure 6:
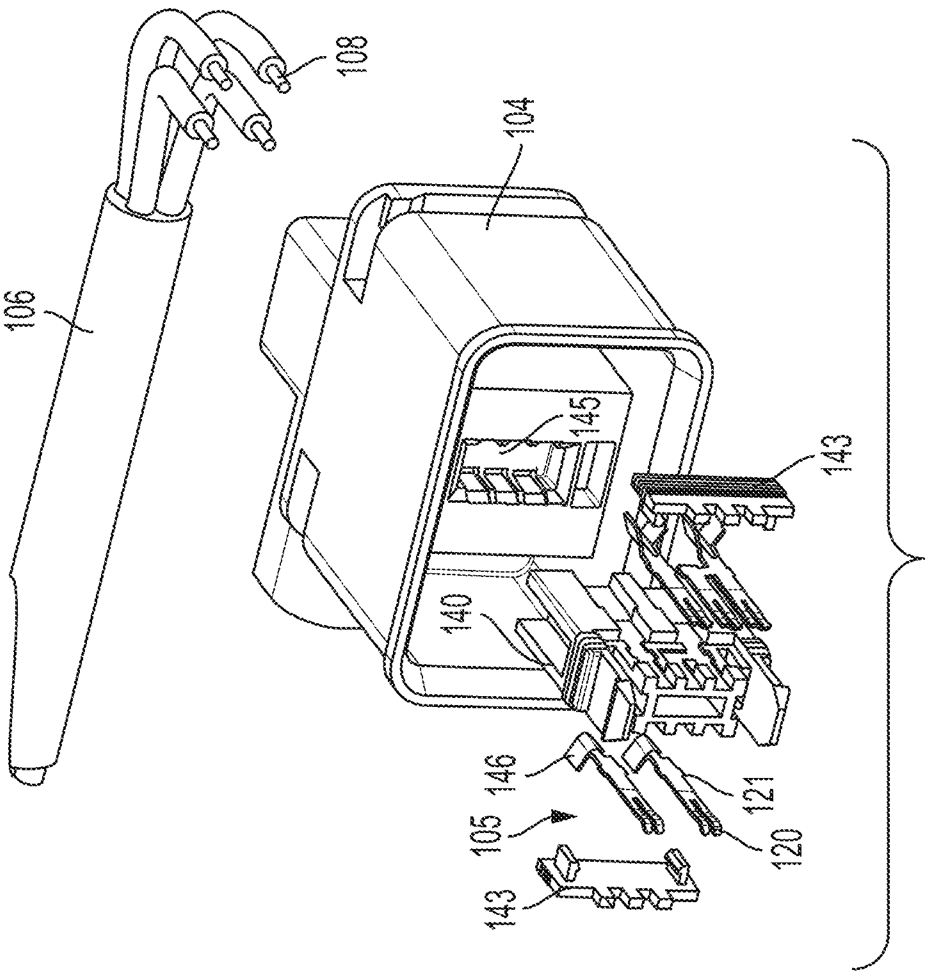
FIG. 6 is an exploded view of an cable assembly having a plurality of mating contacts and a contact holder, in accordance with some embodiments.

FIG. 6 is an exploded view illustrating a cable assembly 101 for use in connection with interconnection system 100, in accordance with some embodiments. Cable assembly 101 comprises plug connector 104, which may include contact holder 140, contact covers 143, and mating contacts 105. An end of cable 106 may be inserted in plug connector 104, and the cable's conductive wires may be terminated and placed in electrical contact with mating contacts 105. Contact holder 140 and contact covers 143 are collectively referred to as the "contact carrier."

Mating contacts 105 may each include a mating contact portion 120 configured to contact mating contacts 136, contact tails 146 configured to contact conductive wires 108, and intermediate portions 121, disposed between contact tails 146 and 120. In some embodiments, contact tail 146 each include a V-shaped receptacle for receiving an end of a wire 108. The V-shaped receptacle may be shaped and sized to secure the end of the wire while providing an electrical contact. Mating contacts 105 may be supported, at least partially inside opening 145, by contact holder 140. Contact covers 143 may include support features for setting the contact force associated with mating contact portions 120.

According to one aspect of the present application, the contact force associated with the mating contact portions of the mating contacts 105 may be adjusted by adjusting the compliance of the mating contact portions. Specifically, the stiffer the mating contact portions, the larger the force with which projection 134 is retained once it has been inserted in the opening. The inventors have appreciated that in some circumstances the contact force may be set (for example by the manufacturer or the user) based on the anticipated environment in which interconnection system 100 is to be utilized. For example, if it is anticipated that interconnection system will likely experience mechanical vibrations, it may be desirable to increase the contact force to reduce to likelihood that the mating contacts are disconnected from each other. In some embodiments, the contact force provided by a connector may be determined by the extent to which the mating contact portions in the receptacle can flex when a mating element is inserted.

Figure 7B:
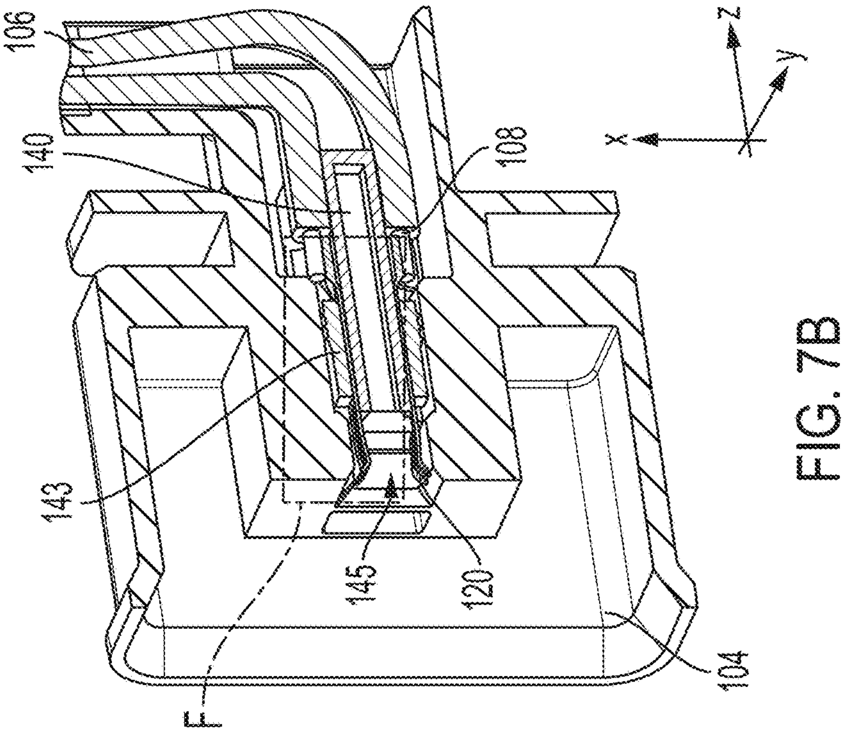
FIG. 7B is a cross section along the line 7-7 in FIG. 2, of a plug connector housing, prior to an over molding operation, in accordance with some embodiments.
Figure 7A:
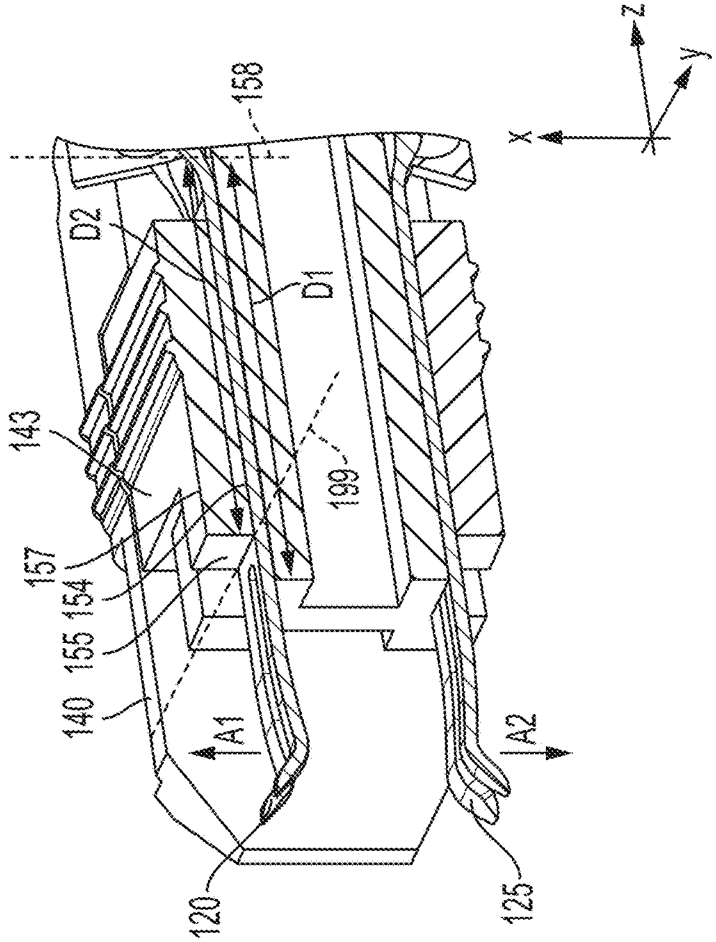
FIG. 7A is a cross section of mating contacts held by a contact holder, in accordance with some embodiments.

FIG. 7A illustrates a cross sections of plug connector 104, in accordance with some embodiments. FIG. 7A illustrates how a mating contact portion's ability to flex may be adjusted to set a desired contact force. As illustrated, a pair of opposite mating contact portions 120 may form a receptacle for receiving a mating element in between. When a mating element is inserted, the mating contact portions 120 may flex away as illustrated by arrows A1 and A2. The lower the mating contact portions ability to flex, the larger the resistance to insertion of the mating element and as a result, the larger the retaining contact force. Accordingly, the contact force may be adjusted by adjusting the mating contact's ability to flex. This may be accomplished, at least in some embodiments, by adjusting the hinge axis of the mating contact.

The hinge axis of mating contact 105 is indicated with numeral 199 in FIG. 7A. When a mating element is inserted in the opening 145, the mating element cause mating contact portions 120 to flex away. Flexing is enabled by pivoting relative to hinge axis 199. In some embodiments, the location of the hinge axis along the length of the mating contact can be determined by using contact cover 143. In the embodiment illustrated, a portion of mating contact 105 is disposed between a portion of contact holder 140 and contact cover 143. In some embodiments, contact cover 143 includes a projection 157 (also referred to as "finger" or "finger portion") that extends along the mating direction towards mating contact portion 120. Contact cover 143 is arranged such that its sidewall 154 is in contact with mating contact 105.

In some embodiments, intermediate portions 121 comprise a first side and a second side. Mating contacts 105 may be mounted with the first sides of the intermediate portion 121 against the contact holder 140 over a first distance D1 from an end 158 of the mating contact adjacent the contact tails 146. Contact cover 143 may be mounted with the second side of the intermediate portions 121 against the contact cover 143 over a second distance D2 from the end 158 of the mating contact adjacent the contact tails. In some embodiments, the second distance D2 is shorter than the first distance D1, as illustrated in FIG. 7A. It should be appreciated, however, that in other embodiments second distance D2 may be greater than the first distance D1.

The location of the hinge axis 199 along the length of the mating contact is determined by the location of the end 155 of projection 157. The closer the end 155 to the mating contact portion 120, the less the mating contact portion's flexibility, and as a result the larger the retaining contact force. Accordingly, the location of the projection 157's end may be adjusted to produce a desired contact force.

In some embodiments, the mating contact associated with the mating contact portions 120 may be adjusted based on the length of projection 153. For example, projections that are arranged to extend farther along the mating direction may lead to a larger contact force. The length of the projection 153 may be set at the factory based for example on the application in which the plug connector is intended to be used.

In some embodiments, the contact force may be adjusted by the user. For example, the contact cover 143 may be allowed to slide in the mating direction (along the z-axis), such that the location of the projection's end relative to the mating contact may be adjusted. In this way, the user may set the contact force as desired by sliding the contact cover, which may shift the location of the hinge axis 199.

To facilitate insertion of a mating element, in some embodiments, the mating contact portions 120 may include respective convex portions 125. In some embodiments, two opposite mating contact portions 120 are arranged such that their respective convex portions 125 face one another.

FIG. 7B illustrates contact holder 140, contact cover 143 and mating contacts 105 when placed in opening 145 of plug connector 104. As illustrated, contact cover 143 may be placed in a cavity formed between a portion of plug connector 104 and contact holder 140. When a mating element (e.g., projection 134) is inserted into opening 145, the mating contact portions 120 may flex away thus allowing further insertion of the mating element. As illustrated in FIG. 7B, opening 145 may be disposed between a first opening and a second opening. The first opening may be configured to receive a portion of a complementary connector (such as panel connector 130). The second opening may be configured to receive cable 106. The shell of plug connector 104 may be formed to include the first opening, the second opening and opening 145.

Figure 7C:
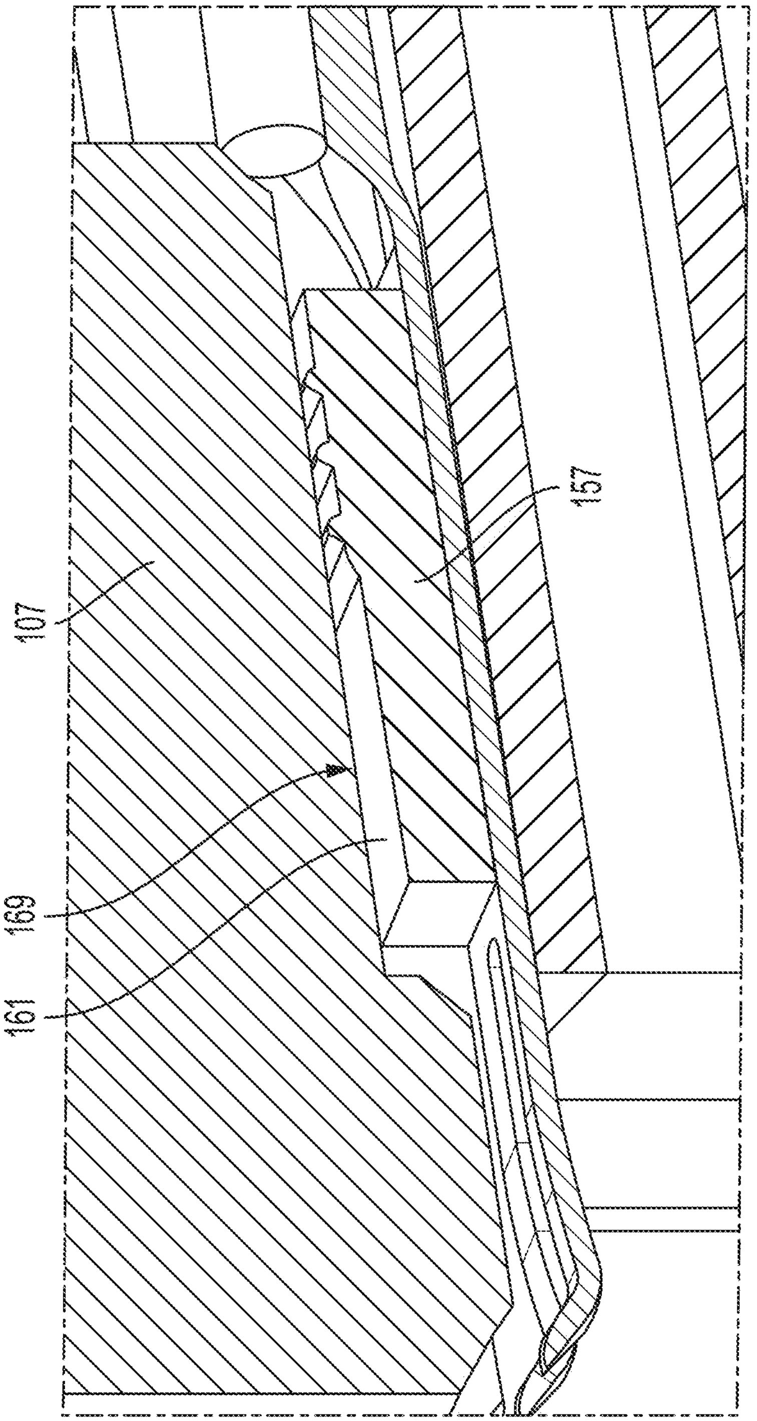
FIG. 7C illustrates the portion of the plug connector housing labeled F in FIG. 7B in additional detail, in accordance with some embodiments.

In the configuration illustrated in FIGS. 7B-7C, a gap may be formed between projection 157 and an inner wall of the plug connector's housing 107. FIG. 7C, which illustrates the portion labeled F in FIG. 7B in additional detail, shows how a gap 161 is formed between projection 157 and wall 169. In some circumstances, when the mating contact portions 120 are flexed (as illustrated by arrows A1 and A2 of FIG. 7A) following mating of the plug connector with a complementary connector, the distal portion of the projection 157 may be pushed away by the mating contact thus closing the gap 161. This motion of the projection 157 may lead to a shift in the position of the hinge axis relative to axis 199 (FIG. 7A). As a result, the contact force with which the complementary connector is retained by the mating contacts 120 diminishes throughout the insertion of the complementary connector. The reduction in the contact force may result in poor electrical connection in the presence of vibrations. The inventors have appreciated, however, that motion of the projection 157 following mating of the plug connector may be blocked (or at least limited) by reducing or eliminating the gap between projection 157 and wall 169.

Figure 7E:
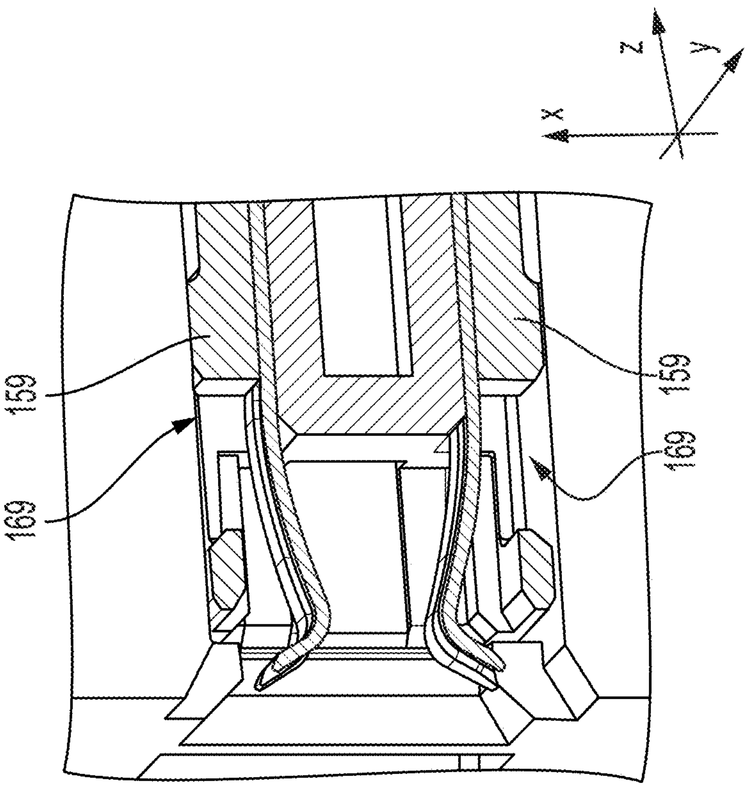
FIG. 7E is a cross section illustrating the rib of FIG. 7C when abutting an inner wall of the plug connector, in accordance with some embodiments.
Figure 7D:
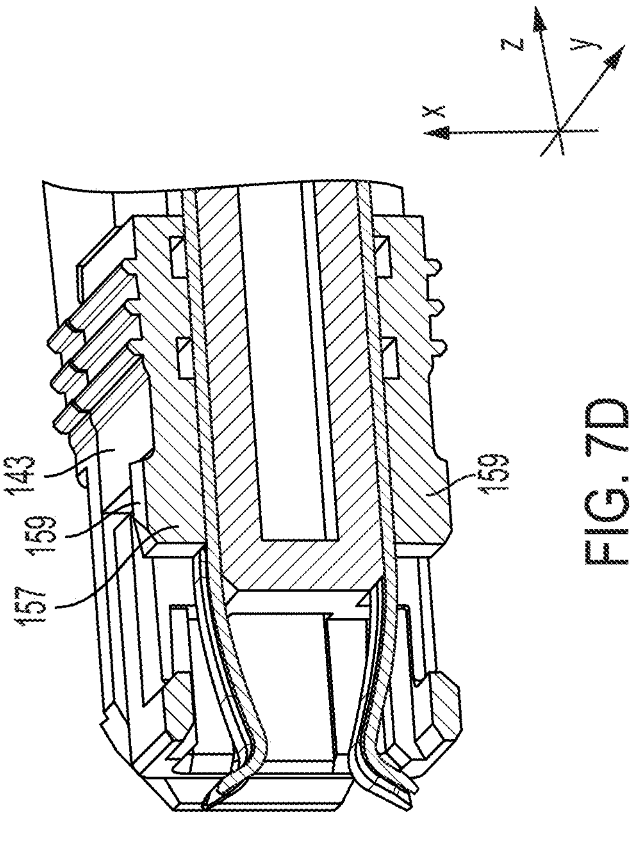
FIG. 7D is a cross section illustrating a contact cover having a rib positioned on a projection, in accordance with some embodiments.

Accordingly, in some embodiments, a projection 157 may include a rib extending toward wall 169, as illustrated in FIG. 7D. In this example, projection 157 includes a rib 159 protruding laterally along the x-axis direction. As further illustrated in FIG. 7E, rib 159 may be sized to abut wall 169 when the plug connector is assembled, though not all embodiments are limited in this respect. In this way, projection 157 may have little room (or no room at all) to move following flexure of the mating contacts, thus maintaining desired contact force.

Figure 8A:
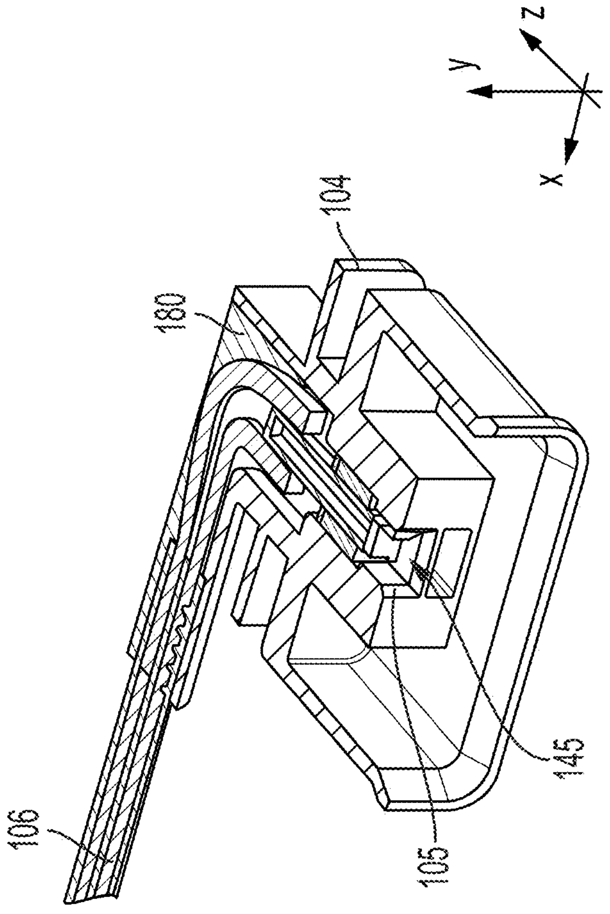
FIG. 8A is a cross section along the line 7-7 in FIG. 2, of a plug connector housing, following an over molding operation in accordance with some embodiments.

In some embodiments, it may be desirable to overmold the plug connector 104 to ensure that the cable is reliably secured to the plug connector, and/or to insulate conductors that may be exposed at the cable's termination. The overmolding may be performed, at least in some embodiments, by injecting a fluid in the opening of the plug connector through which the cable is passed. Subsequently, the fluid may be allowed to solidify, thus holding the cable and the plug connector together. One illustrative configuration in which overmold is performed is shown in FIG. 8A, which depicts a cross section (in the xz-plane) of the plug connector of FIG. 1, in accordance with some embodiments. In some embodiments, a fluid 180 may be injected through the opening of the plug connector 104 that receives cable 106. The fluid 180 may form an insulative material when solidified. The overmold may prevent stress on the electrical connection between the conductors of the cable and the mating contacts in case the cable is accidentally pulled away.

Figure 8B:
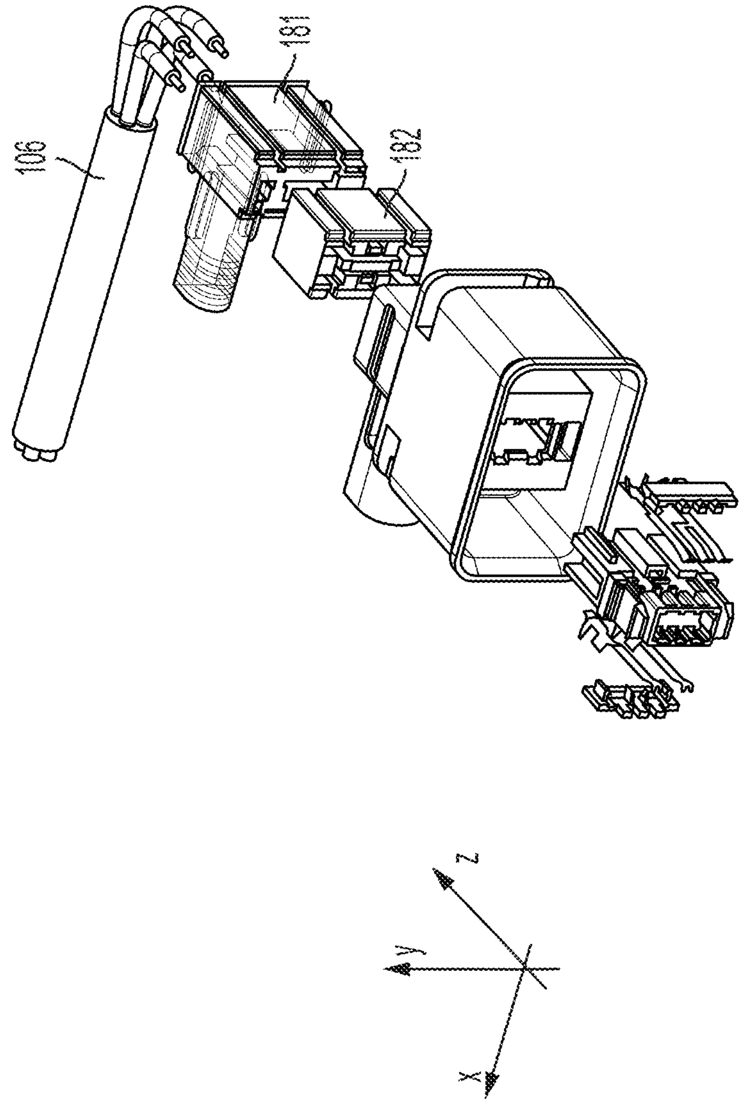
FIG. 8B is an exploded view of an cable assembly having a plastic overmold for reliably securing the cable to the plug connector, in accordance with some embodiments.

FIG. 8B is an exploded view of plug connector 104 illustrating how fluid 180 may appear after solidification, according to another embodiment. Overmold 181, obtained by solidifying fluid 180, extends in the plug's connector housing and outside cable 106, in this non-limiting example. In some embodiments, overmold 181 may be formed via a low-pressure overmold process. In some embodiments, as further illustrated in FIGS. 8B-8C, a potting element 182 may be positioned inside the plug connector's housing for shock absorption. Potting element 182 may be made of a resilient (e.g., silicone rubber) or a gelatinous material (e.g., epoxy).

Figure 8C:
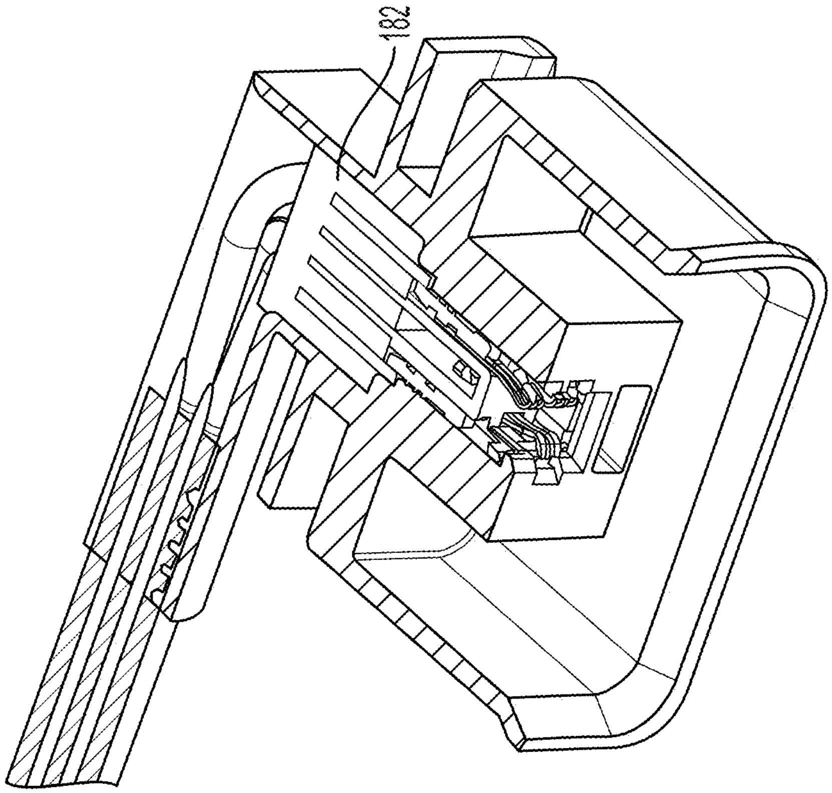
FIG. 8C is an isometric view illustrating the cable assembly of FIG. 8B when assembled, in accordance with some embodiments.
Figure 8D:
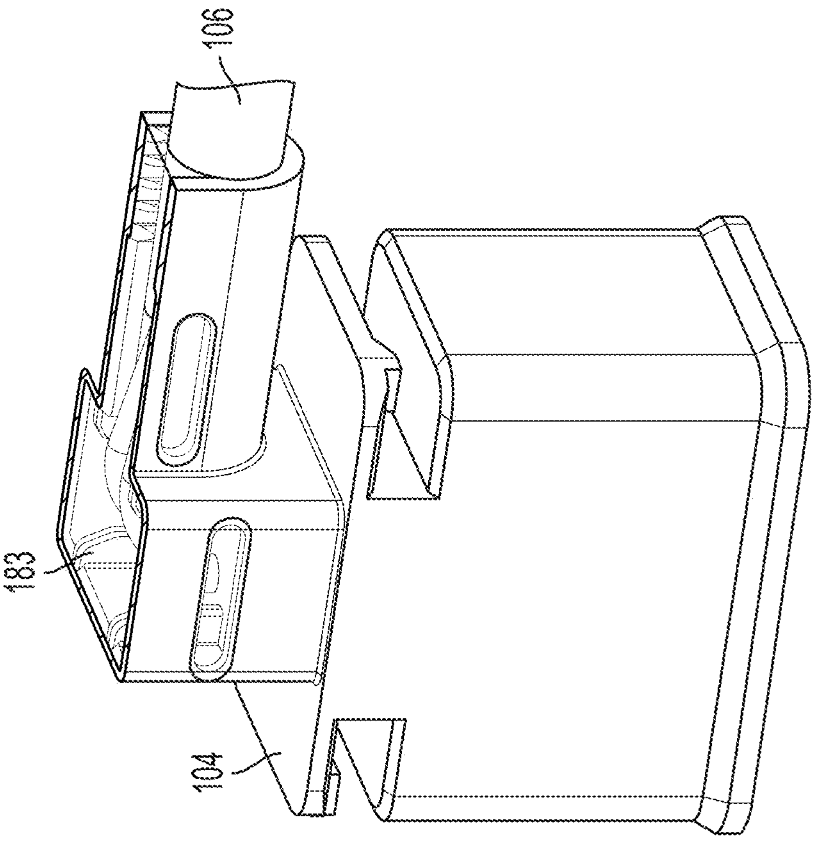
FIG. 8D is an isometric view of a plug connector having a plurality of ribs in contact with an overmold material, in accordance with some embodiments.

In some embodiments, ribs may be formed in the region of the plug connector where the cable's wires are inserted, as shown in FIG. 8C. As shown, ribs 183 may be formed in the sidewalls of the plug connector in the region that is overmolded. Ribs 183 may aid in maintaining the overmold in place by increasing the friction between the overmold and the plug connector.

The inventors have appreciated that injecting fluid in the plug connector as described above may cause part of the fluid to reach mating contact portions of the mating contacts 105, which may create an undesired insulating barrier around the mating contact portions. The formation of such a barrier may impair the connector's ability to electrically contact a complementary connector. In some embodiments, passage of the fluid may be prevented by blocking the injected portion of the plug connector from the portion in which the mating contacts are placed. In some embodiments, blocking may be accomplished by at least partially filling, with ribs, passageways that may otherwise be formed in the plug connector.

Figure 9B:
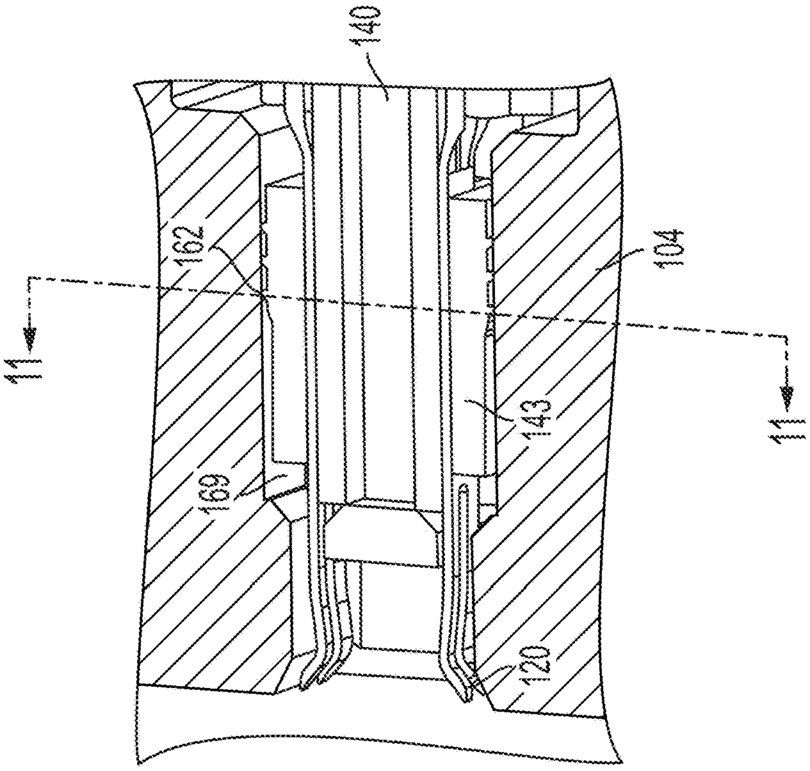
FIG. 9B is a cross section along the line 7-7 in FIG. 2 of a contact holder when mounted in a plug connector housing, in accordance with some embodiments.
Figure 9A:
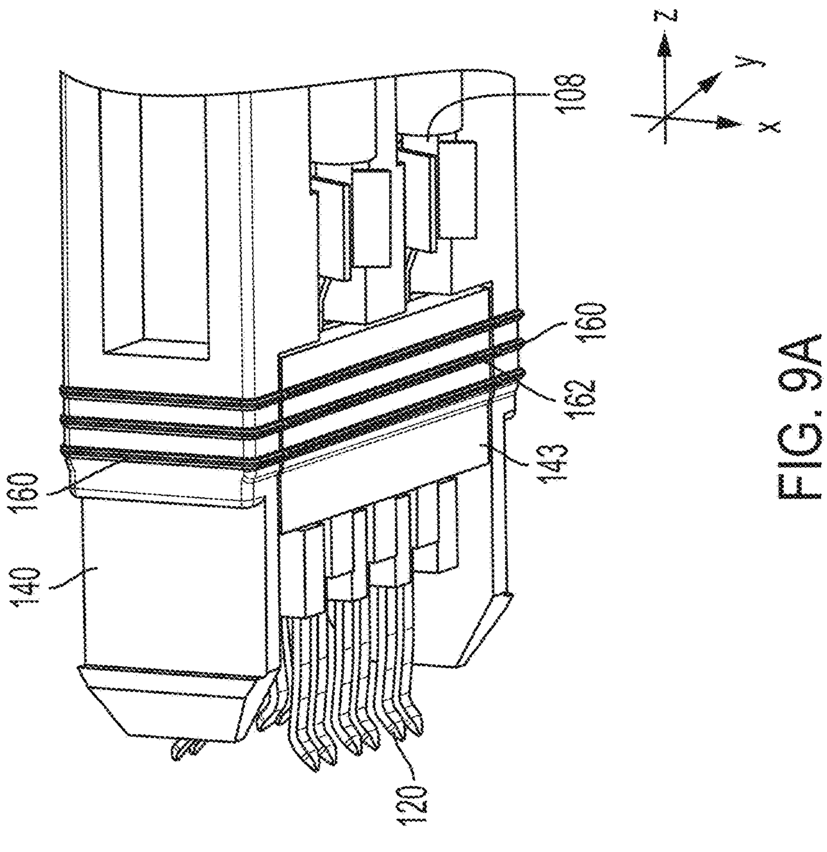
FIG. 9A is an isometric view of an illustrative contact holder, in accordance with some embodiments.

FIG. 9A is an isometric view illustrating a portion of the plug connector of FIG. 1, in accordance with some embodiments. In particular, FIG. 9A illustrates contact holder 140, contact cover 143, mating contact portions 120 and the terminated ends of the cable's conductive wires 108. In some embodiments, one or more ribs 160 may be formed on the outer surface of the contact holder 140 and one or more ribs 162 may be formed on the outer surface of the contact covers 143. As illustrated in FIG. 9A, ribs 160 and 162 may be longitudinally aligned with one another such that a continuous rib is formed around the outer perimeter of the assembly (the assembly comprising the contact holder 140 and contact covers 143). Ribs 160 may protrude from the contact holder along a direction perpendicular to the mating direction (e.g., along the x-axis or the y-axis depending on location). Additionally or alternatively, ribs 162 may protrude from the contact cover in a direction perpendicular to the mating direction (for example along the x-axis).

FIG. 9B is a cross sectional view taken in the xz-plane of the plug connector of FIG. 1, in accordance with some embodiments. As illustrated, when the contact holder 140 and the contact covers 143 are placed in the plug connector's housing, passage of the fluid may be prevented by the presence of the ribs 160 and 162. For example, ribs 162 may be arranged to abut wall 169. In this way, the channel that would otherwise exist between wall 169 and contact cover 143 is obstructed. Similarly, ribs 160 may abut against a wall (not shown in FIG. 9B) of the plug connector's housing. This wall may be perpendicular to wall 169. It should be appreciated that in some embodiments, ribs may be formed in the walls (e.g., wall 169) of the plug connector's housing. These ribs may be abut outer surfaces of the contact holder and/or the contact covers.

Figure 10B:
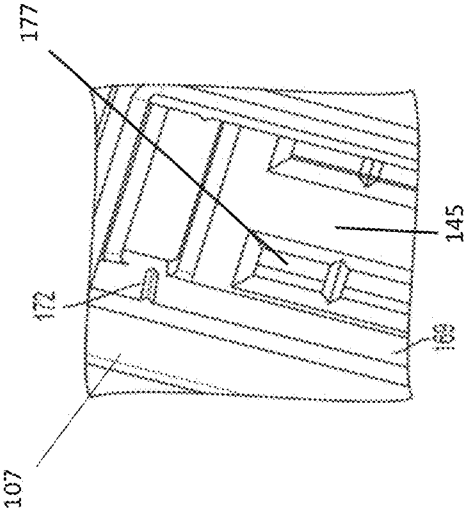
FIG. 10B is an isometric view of a housing of the plug connector of FIG. 2 illustrating a rib, the isometric view being taken along the direction of insertion of the mating contact portions of FIG. 7B into the housing, in accordance with some embodiments.
Figure 10A:
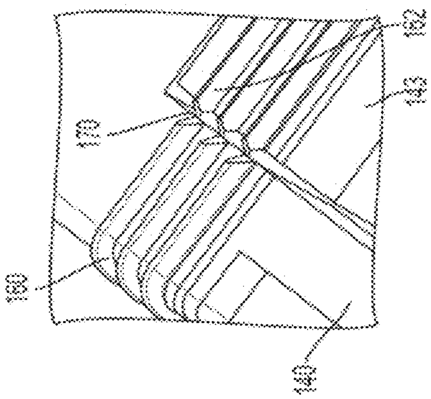
FIG. 10A is an enlarged isometric view of a portion of the contact holder of FIG. 9A illustrating a plurality of ribs, in accordance with some embodiments.

The inventors have further appreciated that, in some circumstances, non-zero manufacturing tolerances may give rise to a discontinuity in the region where ribs 160 and 162 come together. An illustrative discontinuity is shown in FIG. 10A, which depicts respective portions of contact holder 140 and a contact cover 143, in accordance with some embodiments. In this case, a discontinuity 170 is formed between rib 160 and rib 162, which may give rise to a passageway for the fluid.

To prevent the formation of these passageways, in some embodiments, ribs may be formed in the walls against which the ribs 160 and 162 are abutted. One example of such a rib is shown in FIG. 10B, which depicts an inner portion of the plug connector of FIG. 1, when the contact holder and the contact covers are removed, in accordance with some embodiments. FIG. 10B provides another perspective of opening 145 (also shown in FIG. 7B). Further, FIG. 10B illustrates slots 177, through which the ends of mating contact portions 120 pass when contact holder 140 is inserted inside opening 145. In this case, rib 172 is formed on the wall 169 of housing 107 and is positioned to align with the discontinuity 170 so as to occupy the void created between ribs 160 and 162. In some embodiments, multiple ribs 172 may be used, and each one these ribs may be aligned with a respective discontinuity.

Figure 11B:
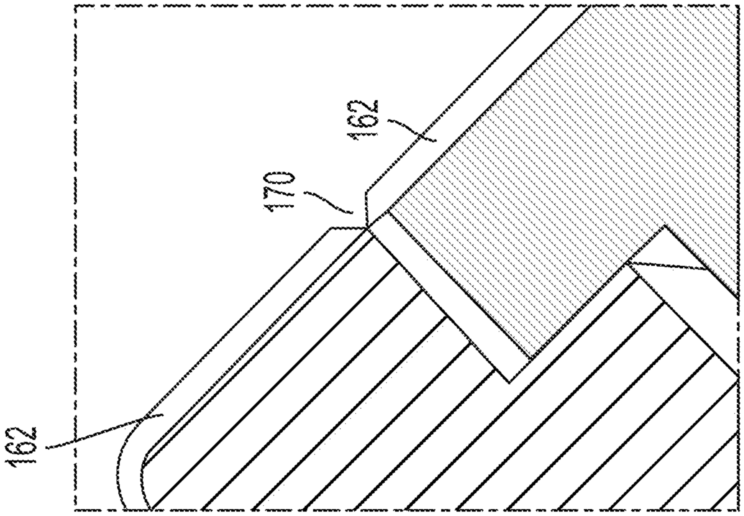
FIG. 11A and FIG. 11B are cross sections along the line 11-11 in FIG. 9B, in accordance with some embodiments.
Figure 11A:
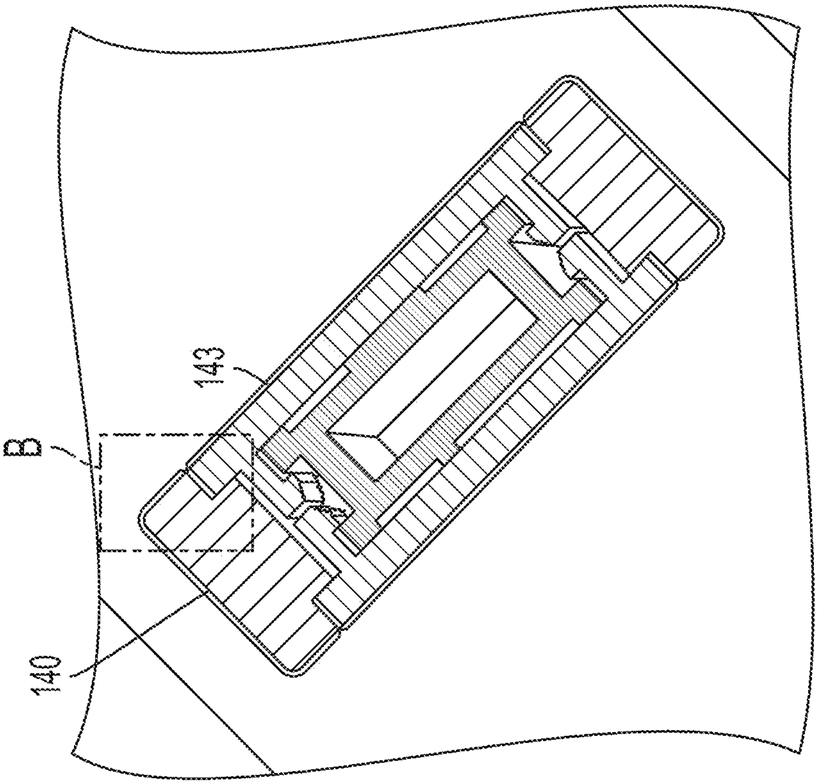

FIG. 11A is a cross sectional view of the plug connector of the example of FIG. 1 taken in the xy-plane, in accordance with some embodiments. This figure illustrates contact holder 140 and contact covers 143 when assembled in the plug connector 104. FIG. 11B illustrates a portion (labeled "B") of FIG. 11 in additional detail. As illustrated, rib 170 is aligned with the discontinuity existing between ribs 160 and 162, such that the void between such ribs is filled.

Figure 12:
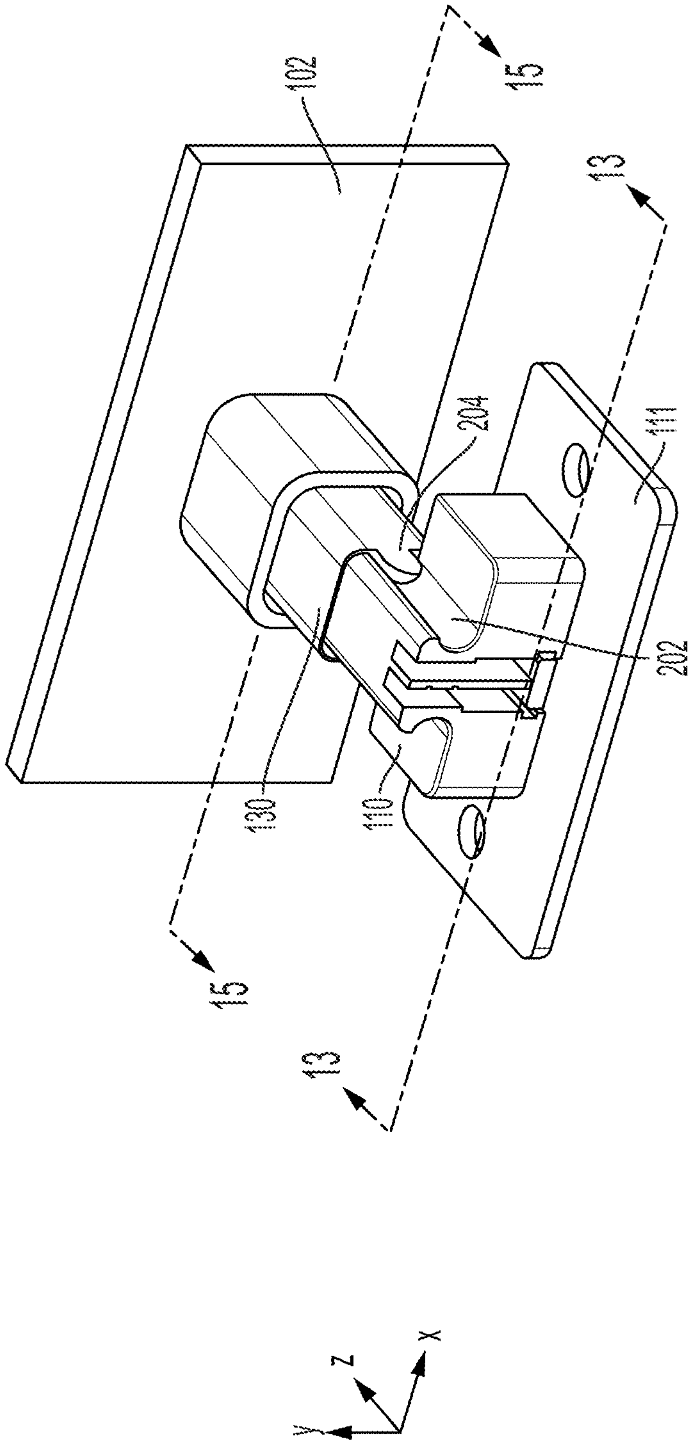
FIG. 12 is an isometric view of a board connector having a channel for facilitating engagement with a panel connector, in accordance with some embodiments.

As described above, a plug connector, such as is illustrated in FIG. 11A may mate with a panel connector, such as panel connector 130 shown in FIG. 3A. The panel connector may be installed in a panel of an electronic enclosure, such as is illustrated in FIG. 3B. The panel connector may mate with another connector inside the enclosure, such as a board connector 110, shown in FIG. 3B. Engagement of a panel connector with a board connector may be facilitated by using, at least in some embodiments, guiding structures. These structures may be adapted to allow the panel connector to be guided in position by sliding a projection into a corresponding channel. FIG. 12 is an isometric view of a board connector having one or more channels for receiving one or more guiding structures from a panel connector, in accordance with some embodiments. As illustrated, in this configuration panel connector 130 includes a plurality of projections 204 formed at the mounting interface (the interface through which the panel connector 130 may be mounted to the board connector 110). Board connector 110 may include channels 202 formed on the board connector's exterior housing. In one example, channels 202 include concave surfaces formed on the board connector's housing. However, it should be appreciated that any suitable complementary guiding structures on the panel connector and the board connector may be used, including for example full round or triangular projections and complementary channels.

Channels 202 and projections 204 may be arranged to facilitate mounting of the panel connector to the board connector. For example, channels 202 and projections 204 may be sized and shaped such that projections 204 slide in respective channels, thus guiding insertion of the board connector through the opening formed inside the panel connector's exterior housing. It should be appreciated that projections may extend from either the panel connector or the board connector. However, having the projections extend from the panel connector may be beneficial, at least in some embodiments, because it reduces the guiding distance. While two channels and two projection are formed in the embodiment illustrated in FIG. 12, any suitable number of channels and projections may be used in other embodiments. Moreover, the guiding projections and channels are shown integrally formed with housings of the connectors, which in the illustrated embodiment results from forming the guiding features as part of molding the housing, integrally formed guidance components are not required. The guidance features, for example, may be a formed in separate modules coupled to either or both of the connector housings.

Figure 13B:
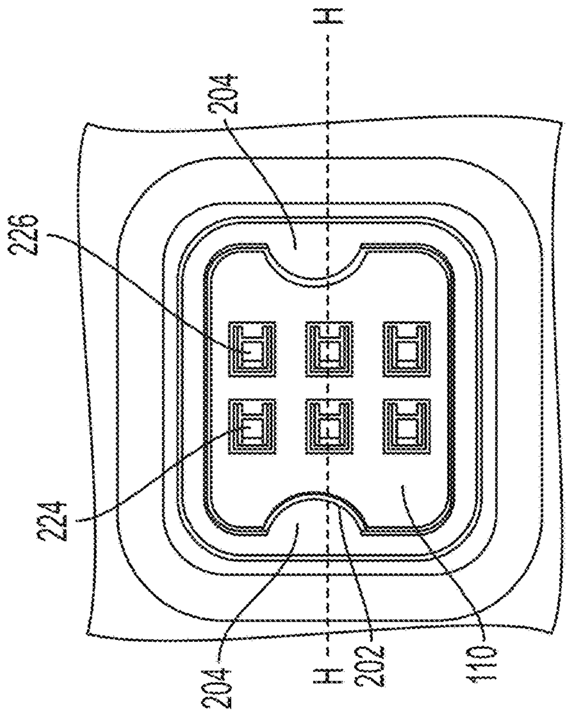
FIG. 13B is top view of the board connector of FIG. 12 taken as a cross section along the line 15-15 in FIG. 12, in accordance with some embodiments.
Figure 13A:
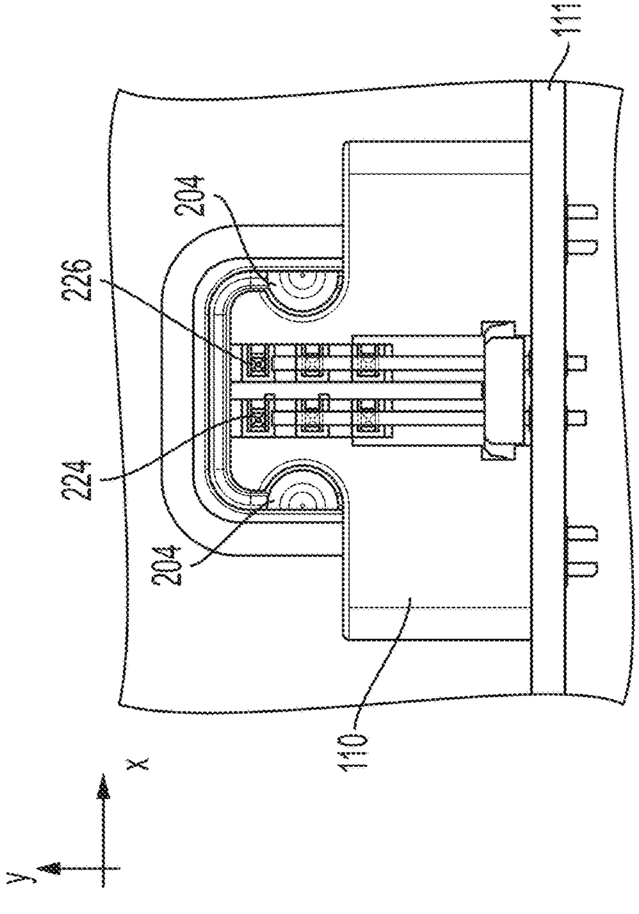
FIG. 13A is a bottom view of the board connector of FIG. 12 taken as a cross section along the line 13-13 in FIG. 12, in accordance with some embodiments.

In some embodiments, to ensure that the board connector and the panel connector are mated in a proper orientation, asymmetric receptacles may be used. In this way, if the board connector is inserted in the panel connector in the wrong orientation, mating is precluded. FIGS. 13A-13B illustrate bottom and top views, respectively, of board connector 110 in the orientation shown in FIG. 3B, in accordance with some embodiments. In particular, FIG. 13A is a bottom end view from the perspective of line 13-13 in FIG. 12. FIG. 13B is a cross section along the line 15-15 in FIG. 12. FIGS. 13A and 13B illustrate two parallel planes taken at different locations of the board connector, where the plane of FIG. 13B is the closer to panel 102.

As illustrated, board connector 110 includes receptacles, of which receptacles 224 and 226 are numbered. The receptacles are configured to receive the ends of mating contacts 136 (shown for example in FIG. 15E). Receptacles 224 and 226 may be arranged to be symmetric with respect to line HH, which passes through the center of the panel connector to board connector mating interfaces. As a result, mating contacts 136 would align with respective receptacles even if the panel connector 130 were rotated 180 degrees relative to the board connector. However, projections 204 and channels 202 may be arranged to be asymmetric with respect to line HH. In the embodiment of FIG. 13B, channels 202 are not centered on line HH. Rather, the centers of channels 202 and projections 204 are offset from the line HH. As a result, if an attempt to mate the panel connector with the board connector in the wrong orientation is made, insertion of the mating contacts in the receptacles is precluded. Vice versa, if the board connector is inserted in the panel connector properly, mating is permitted.

The inventors have appreciated that the seals described above may be damaged or otherwise wear off due to prolonged contact with foreign matter penetrating inside the interconnection system. Accordingly, the inventors have developed a design for protecting the seal from accidental damage. In some embodiments, the seal may be protected by raising the portion of the panel in contact with the panel connector relative to the plane of the panel, thus forming a wall at the base of the panel. In this way, foreign matter that may otherwise penetrate and contact the seal may be blocked by the walls of the raised portion.

Figure 14B:
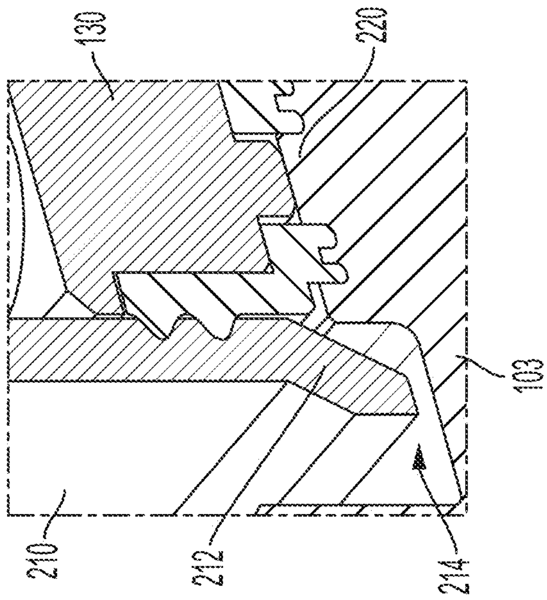
FIG. 14B is an enlarged isometric view, cut away, of the portion labeled F in FIG. 14A, in accordance with some embodiments.
Figure 14A:
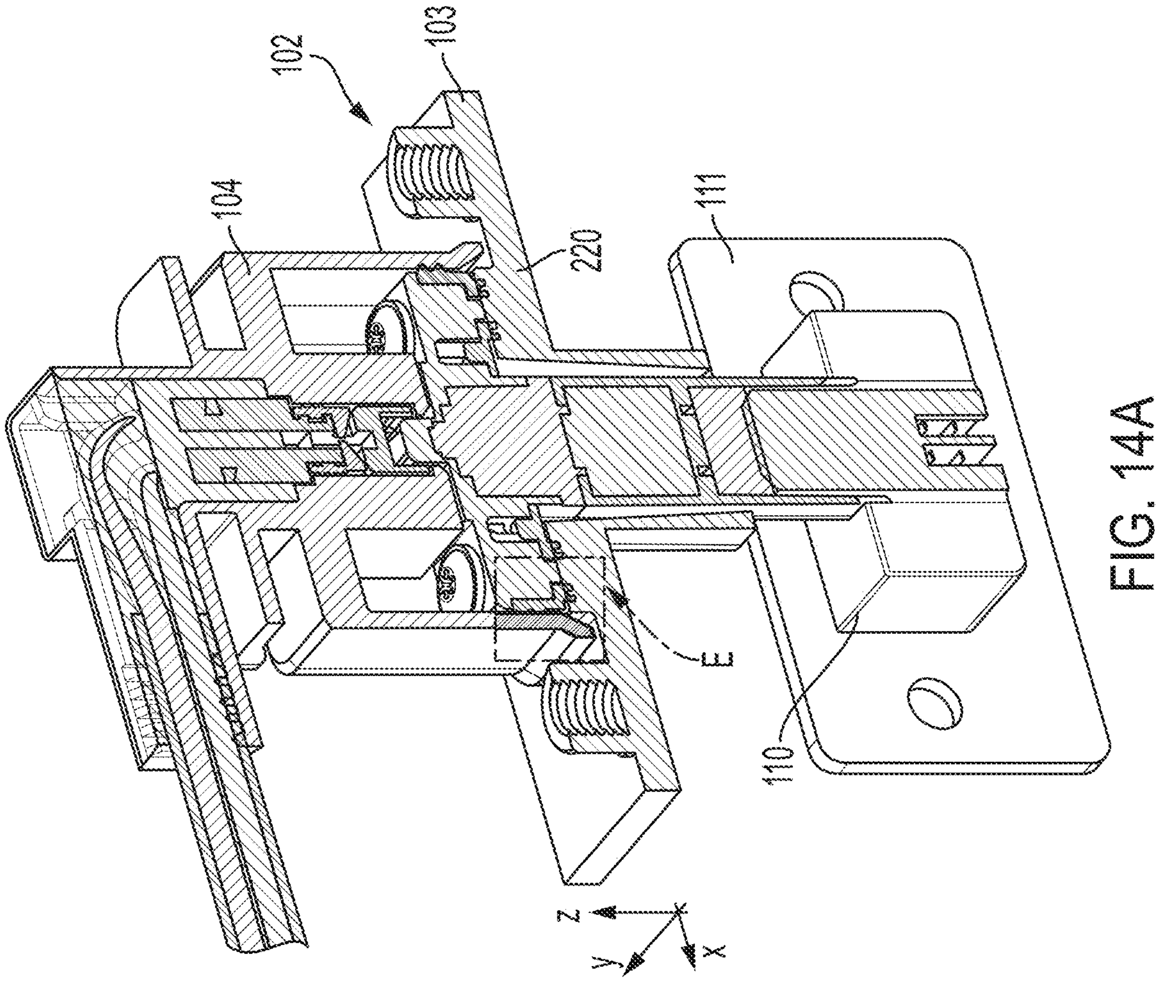
FIG. 14A is an isometric view, cut away, of an interconnection system having a plug connector engaged to a panel connector via a panel, in accordance with some embodiments.

One example of such an arrangement is illustrated in FIGS. 14A-14B. FIG. 14A is an isometric view, partially cut away, of an interconnection system having a plug connector engaged to a panel connector, which is mounted to a panel. FIG. 14B is an enlarged view of portion E of FIG. 14A, in accordance with some embodiments. As illustrated, in this embodiment panel 102 includes a planar base 103 and a raised portion 220, whose top surface is offset (along the z-axis) relative to the top surface of the planar base. As further illustrated, the raised portion 220 may surround the opening through which panel connector 130 is inserted. Even if foreign matter accidentally passes through a gap formed between the panel and the plug connector, the likelihood that the foreign matter will contact the seal by climbing the raised portion 220 is substantially reduced relative to panels having completely flat surfaces.

Plug connector 104 may comprise slanted ends 212 formed on the sidewalls 210 of the plug connector's housing. The slanted ends may be shaped to extend, at an angle, outwardly relative to the plug connector's housing. The slanted ends may be arranged to protect the raised portion 220 and thus the seal against passage of foreign matter. In some embodiments, when the plug connector is attached to the panel, the slanted ends 212 are separated from the top surface of the panel's planar base 103 by a gap 214 (though in other embodiments, the slanted ends 214 may contact the top surface of the panel's planar base 103).

Figure 15C:
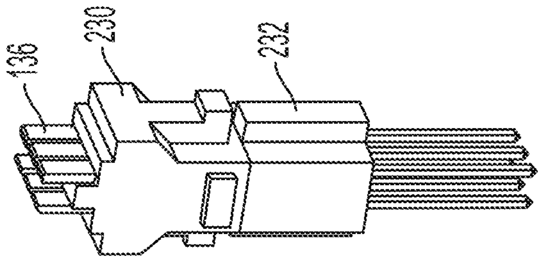
FIG. 15C illustrates another example of a sequence step for fabricating a panel connector, in accordance with some embodiments.
Figure 15B:
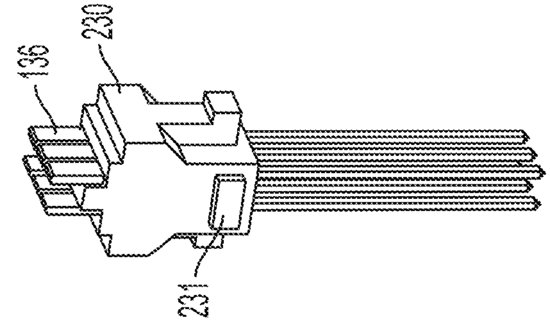
FIG. 15B illustrates another example of a sequence step for fabricating a panel connector, in accordance with some embodiments.
Figure 15A:
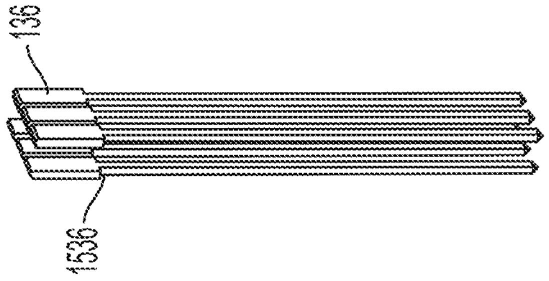
FIG. 15A illustrates an example of a sequence step for fabricating a panel connector, in accordance with some embodiments.

FIGS. 15A-15E illustrate an example of a sequence for fabricating a panel connector, in accordance with some embodiments. This fabrication sequence may lead to a lower cost and more robust connector. In the step of FIG. 15A, a plurality of mating contacts 136 are provided. The mating contacts may be formed by stamping, plating and any other suitable operations. In the embodiment illustrated, the contacts each have the same shape with planar surfaces, for mating with beams of a cable connector, and elongated ends for entering receptacles of a board connector. In the embodiment illustrated, the contacts have shoulders 1536 at an interface between the planar surfaces and a shaft joining the planar surfaces and the elongated ends.

In the step of FIG. 15B, the mating contacts 136 may be inserted into first housing portion 230. In some embodiments, the first housing portion 230 is formed by overmolding the mating contacts. In other embodiments, the first housing portion 230 is formed separately, and the mating contacts are inserted through channels formed in the first housing portion 230. In such an approach, shoulders 1536 may engage corresponding ledges within housing portion 230 so as to position contacts 136. In either event, the mating contacts 136 may be positioned to match the arrangement of corresponding mating contact in a plug connector.

First housing portion 230 may include a protrusion 231, which may be shaped and sized to fix an exterior housing 234 to the first housing portion.

In the step of FIG. 15C, a second housing portion 232 may be installed over the shaft portions of the mating contacts 136. First and second housing portions, or any suitable number of housing portions, may be used, as molding multiple shorter housing portions may be simpler and more accurate than molding one housing portion. Similar to first housing portion 230, second housing portion 232 may be formed by overmolding the mating contacts or may be molded separately. It should be appreciated that, at least in some embodiments, the first and second housing portions are separate pieces, though they may be placed in contact with each other when assembled with the mating contacts 136. It should be further appreciated that the order in which the housing portions are positioned is not limited to the sequence illustrated, as the second housing portion may be positioned prior to positioning of the first housing portion in some embodiments. In some embodiments, the second housing portion may include one or more protrusions shaped and sized to fix the second housing portion to the exterior housing. The first and second housing portions may be offset relative to one another along the length of the mating contact 136.

The steps of FIGS. 15B-15C may ensure that the shoulders of the mating contacts are engaged with the ledges of the housing portion 230. While FIGS. 15B-15C illustrate two separate housing portions, in other embodiments, a single housing portion may be used.

Figure 15E:
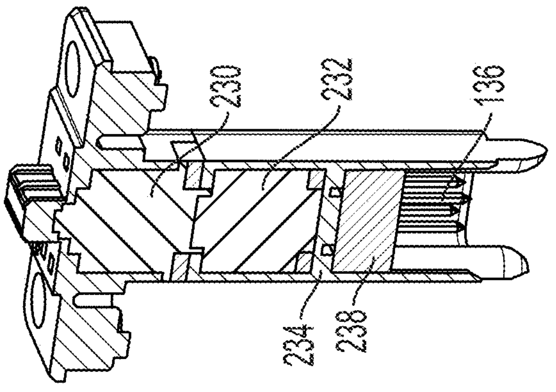
FIG. 15E illustrates another example of a sequence step for fabricating a panel connector, in accordance with some embodiments.
Figure 15D:
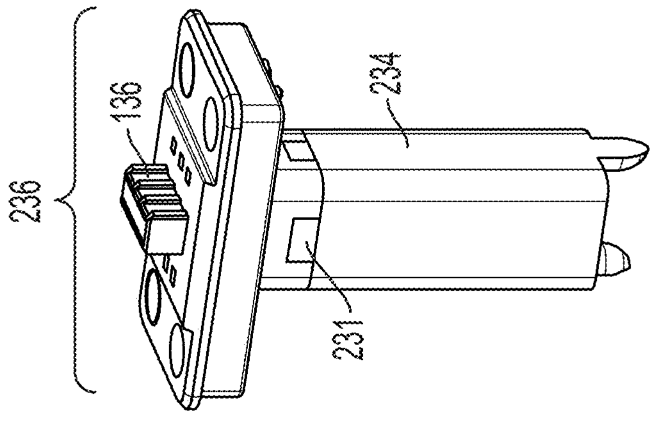
FIG. 15D illustrates another example of a sequence step for fabricating a panel connector, in accordance with some embodiments.

As shown in FIG. 15D (showing a perspective view of the resulting panel connector) exterior housing 234 of the panel connector may be formed. In some embodiments, the exterior housing may be formed by high-pressure overmolding the structure of FIG. 15C.

As further shown in FIG. 5D, to allow electrical connection of the mating contacts 136 to corresponding mating contacts (such as mating contacts 105 of FIG. 2), the ends of mating contacts 136 (which are not necessarily limited to having flat shapes, as shown in FIGS. 15A-15D) may be exposed in an exterior surface of the exterior housing 234.

As further shown in FIG. 15D, the exterior housing may be molded around protrusion 231, thus fixing the two pieces together.

During this overmolding, the mating contacts may be held in place by squeezing them between the metal of a mold and the plastic housing 230. In some embodiments, such as is shown in FIG. 3A, the planar surfaces forming the mating contacts may be flush with an outer surface of the overmolded panel connector. Accordingly, the surface of the mold used during the overmolding to squeeze the contacts and hold them in place may be largely flat. Such a mold may be relatively inexpensive—less expensive than a mold contoured to hold the two columns of contacts in place without a pre-formed housing 230.

As a further benefit of preforming first and second housing portions, the volume of material used in the overmolding may be reduced relative to the volume of overmolded material needed to form the exterior housing entirely via overmolding. This reduction in the amount of material may reduce the formation of shrink holes that may otherwise arise, absent the first and second housing portions, due to the thickness of the exterior housing's walls.

The exterior housing 234 may be molded in any desired shape, including with guidance projections, features to receive a seal and a widened portion 236 configured to be mounted to a panel 102. The widened portion 236 may have a plurality of threaded holes adapted for passage of screws, which may be used for mounting the panel connector to the panel.

In the step of FIG. 15E, a potting element 238 may be placed inside exterior housing 234. Potting element 238 may be made of a resilient (e.g., silicone rubber) or a gelatinous material (e.g., epoxy). Potting element 238 may enclose, at least partially, mating contacts 136. In accordance with some embodiments, potting element 238 may form an environmental seal around the contacts 136 and/or may act as a shock absorbing material, and may reduce vibration of the mating contact surfaces between the panel connector and cable connector if, for example, there is a fan or other vibrating part within an electronic enclosure. Absorbing shocks may increase the life of the mating contacts.

Figure 16C:
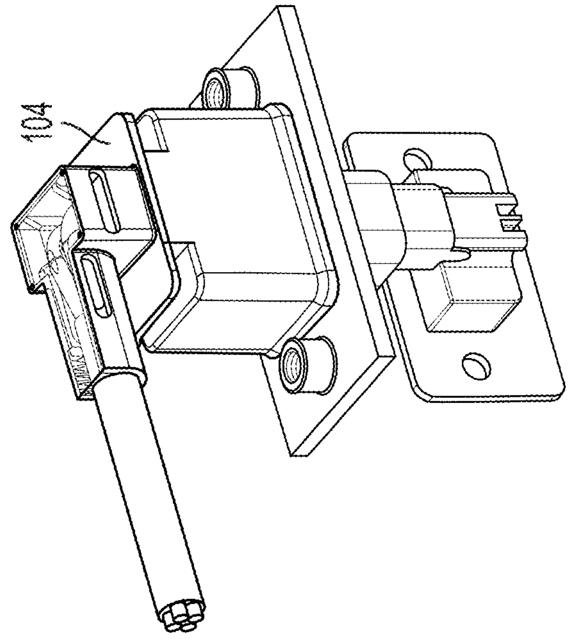
FIG. 16C illustrates an example of a sequence step for assembling an interconnection system, in accordance with some embodiments.
Figure 16B:
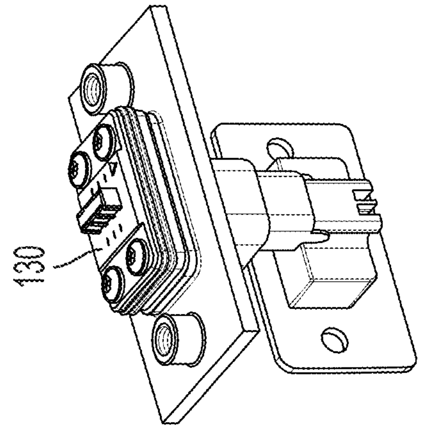
FIG. 16B illustrates another example of a sequence step for assembling an interconnection system, in accordance with some embodiments.
Figure 16A:
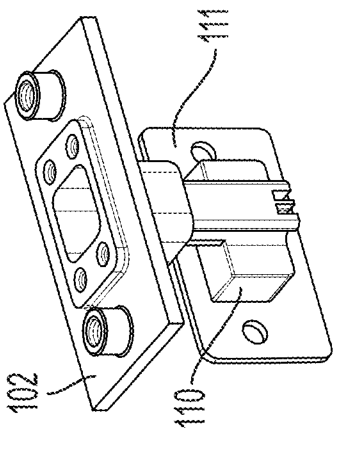
FIG. 16A illustrates an example of a sequence step for assembling an interconnection system, in accordance with some embodiments.

A connector as described herein supports a simple assembly operation of an electronic enclosure. Assembly of a rugged, environmentally sealed interconnection system is illustrated in FIGS. 16A-16C, in accordance with some embodiments. FIG. 16A illustrates a panel 102, a board connector 110 and a circuit board 111. FIG. 16A shows only a portion of a panel that may form an enclosure or other structure supporting electric components. A printed circuit board, including a board connector 110 may be installed in the electronic enclosure. The printed circuit board may be positioned to align board connector 110 with an opening in a panel. Such alignment may be achieved by attaching the printed circuit board to rails or other suitable mounting hardware.

In the step of FIG. 16B, a panel connector 130 may be inserted through the opening in panel 102, for example by passing the panel connector through an opening of the panel. Alignment projections of the panel connector may align the panel connector with the board connector, The panel connector may then be screwed or otherwise attached to the panel. In the step of FIG. 16C, a plug connector 104 may be assembled to the panel 102. The plug connector may be assembled such that its mating contacts are placed in contact with the panel connector's mating contacts.

In some embodiments, the components may be configured to be assembled simply, such that the assembly process may be performed automatically. For example having alignment features that ensure that the panel connector aligns with board connector and that are asymmetrical such that the connectors may be assembled in only one orientation may enable the use of automated assembly tooling. Likewise, the shape of the cable connector relative to the interface of the electronic enclosure may simplify alignment of the cable connector and panel connector such that those components similarly can be automatically assembled.

Some embodiments described herein relate to plug connectors arranged to mate with panel connectors attached to a panel. For example, FIG. 1 illustrates a plug connector 104 mated to a panel connector attached to panel 102. Panel 102 may form a portion of an electronic enclosure (which is not shown fully for simplicity) such that the panel connector 130 forms electrical connections between the plug connector 104 and an interior of the electronic enclosure. A mechanism may be included to complete electrical connections from the panel connector 130 to components inside the electronic enclosure. In embodiments described above, that mechanism was a further mating interface on the panel connector 130, which mated to a board connector 110 that could be attached to a printed circuit board 111 inside the enclosure.

It should be appreciated, however, that the present application is not limited to these types of electrical interconnection systems, as alternative mechanisms to make electrical connections between a panel connector and components inside an electronic enclosure are also possible. With such alternative arrangements, the external mating interface of the panel connector may be configured and manufactured using techniques described above, including the molding process of FIGS. 15A-15D and the sealing arrangement discussed above in connection with FIGS. 3A-5C and 14A-14B.

One possible configuration involves a panel connector being configured to mate with a second cable connector. The second cable connector may support conductive terminals having ends arranged to form electric contacts with the panel connector's mating contacts. Those mating contacts, configured to mate with the second cable connector inside the enclosure, may be configured as in the external mating interface shown in FIGS. 3A and 3B. However, the specific configuration of the internal mating contacts need not match the configuration of the mating contacts at the external interface.

Figure 17B:
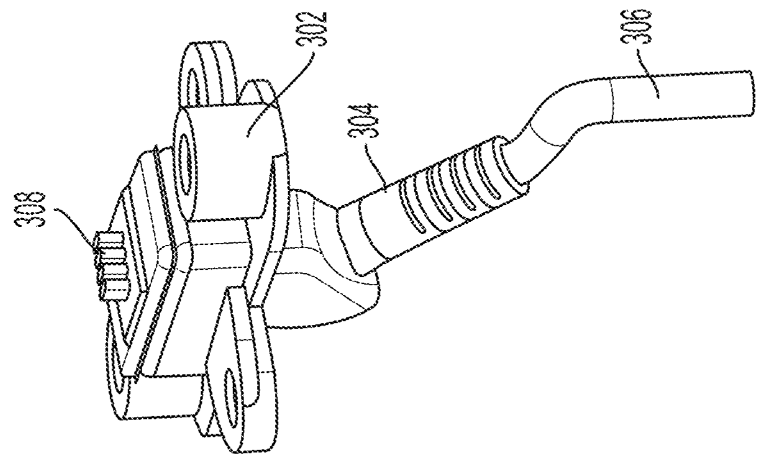
FIG. 17B is an isometric view illustrating the cable connector of FIG. 17A, in accordance with some embodiments.
Figure 17A:
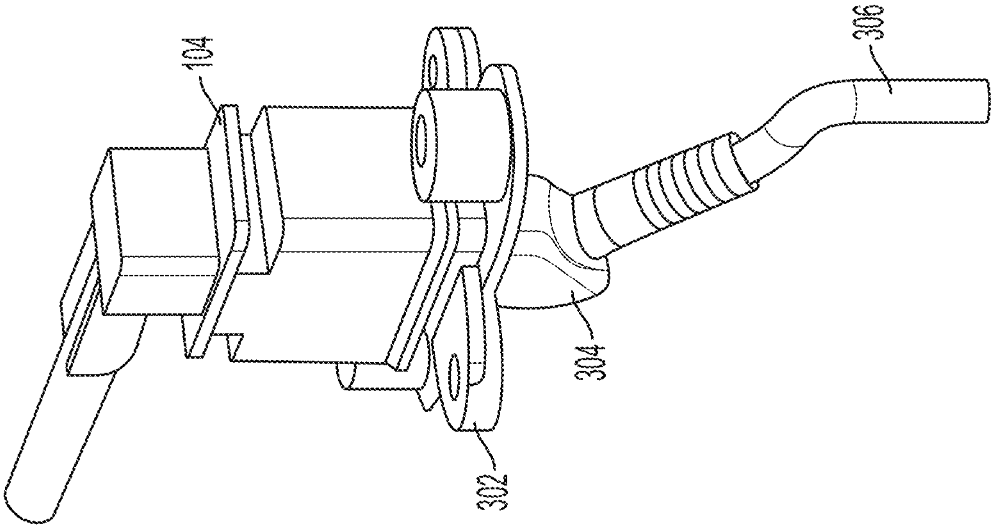
FIG. 17A is an isometric view of an interconnection system having a plug connector and a cable connector, in accordance with some embodiments.

One example of such an arrangement is depicted in FIG. 17A, which illustrates an interconnection system with a plug connector 104 and a second cable connector 304, in accordance with some embodiments. In this example, plug connector 104 is electrically connected to cable 306 via cable connector 304 and panel connector 302. Panel connector 302 has two interfaces, a first, external interface, to which plug connector 104 is attached, and a second, internal interface, to which cable connector 304 is attached. The conductors of cable 306 are then routed to components inside the enclosure. Though panel, such as panel 102, is not illustrated in FIG. 17A for simplicity, it can be seen that panel connector 302 has, similar to the panel connector in FIGS. 3A and 3B, raised elements that will fit through a panel opening and attachment features that enable the connector to be attached to that panel, such as with screws or other fasteners.

As further shown in FIG. 17B, which illustrates the cable connector of FIG. 17A when not mated to the plug connector 104, panel connector 302 may have an external mating interface as shown above. It may present ends 308 of the conductive terminals that are connected to cable 306 via the internal interface of panel connector 302.

In some embodiments, the same plug connector can be engaged to a cable connector, as shown in FIG. 1, and to a panel connector (though of course at different times), as shown in FIG. 17A.

Further, it should be appreciated that a panel connector with an external interface as described herein is not limited to use in systems in which cable assemblies, including a plug connector attached to a cable, are mated to that interface. Any other component that has a mating interface complementary to that the of the panel connector may be used. For example, in place of a plug connector, a jumper may be attached to the mating interface.

Figure 18:
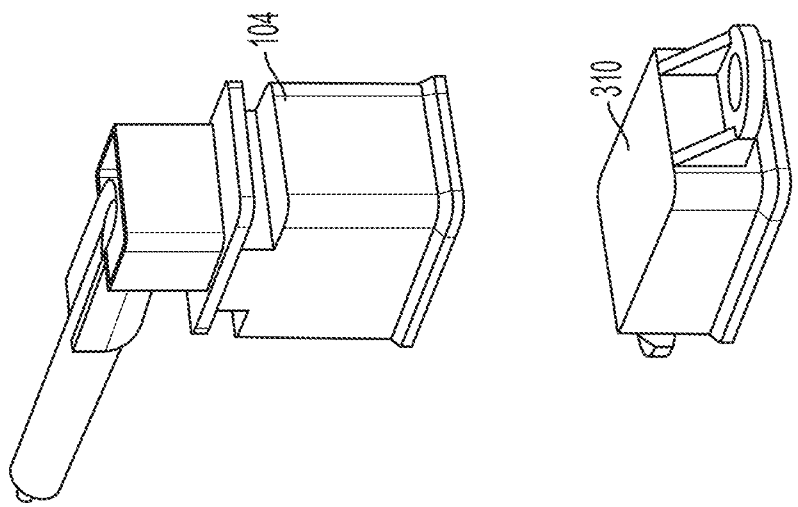
FIG. 18 is an isometric view illustrating a plug connector and a plug adapter, in accordance with some embodiments.

FIG. 18 is an isometric view illustrating a plug connector 104 juxtaposed with a jumper 310, in accordance with some embodiments. Jumper 310 may have a mating interface sized and shaped like the mating face of plug connector 104 so as to mate with the external interface of a panel connector, such as is shown in FIG. 3B or 17B. However, jumper 310 is not attached to a cable, as in cable connector 104. In the embodiment illustrated, the mating contacts within jumper 310 that mate with the panel connector are attached to each other. A jumper may be used to set a configuration of the components inside an electronic enclosure by selectively form connections between points inside the enclosure.

As a specific example, two terminals of a control input and ground may be coupled to contacts of a panel connector. A cable connector 104 may be attached to the panel connector, routing the control inputs to an external controller that will generate a control signal indicating an on or off state. Alternatively, a jumper 310 may be attached to the panel connector. That jumper may have internally a connection between the control inputs that connects the control input terminals together, creating an always on state. Alternatively, the jumper may have internally connections between the control inputs and ground that creates an always off state.

Though jumper 310 may contain, internally, connections between the terminals of the panel connector, it may be configured in other ways. It may, for example have no connections to some or all of the terminals of the panel connector, creating a covering for un-used terminals in some systems. Alternatively or additionally, jumper 310 may contain within its housing electronic components, such as resistors, capacitors, or semiconductor chips, which can generate or modify signals coupled to terminals of the panel connector.

Interconnection systems of the types described herein may be modified in any suitable way. For example, in some embodiments, mating contacts may be placed in the panel connector rather than the plug connector. The contact force of these mating contacts may be adjusted using the techniques described herein. In some such embodiments, the plug connector may include pads for contacting the panel connector's mating contacts.

Techniques described herein may be used in connectors having configurations other than those described above. For example, techniques described herein may be used in mezzanine connectors or in backplane connectors. Such alternative connector configurations may be used with all of the features described herein or a subset of any suitable number of features. Moreover, it should be appreciated that all of the structures, materials and construction techniques described herein may be used together, but, in some embodiments, some or all of the structures, materials or techniques may be omitted.

Such alterations, modifications, and improvements are intended to be part of this disclosure, and are intended to be within the spirit and scope of the invention. Further, though advantages of the present invention are indicated, it should be appreciated that not every embodiment of the invention will include every described advantage. Some embodiments may not implement any features described as advantageous herein and in some instances. Accordingly, the foregoing description and drawings are by way of example only.

Examples of arrangements that may be implemented according to some embodiments include the following:

A1. A plug connector, comprising:

a cable comprising a plurality of conductive wires;

a housing comprising:

a first opening configured to receive a portion of a mating connector;

a second opening; and at least one third opening between the first opening and the second opening; and a plurality of terminals extending through the at least one third opening, the plurality of terminals comprising mating contact portions extending into the first opening and contact tails extending into the second opening, wherein the plurality of conductive wires of the cable are electrically connected to the contact tails of the plurality of terminals within the second opening; and an insulative material within the second opening encapsulating the contact tails of the plurality of terminals within the second opening and closing off passage between the at least one third opening and the second opening.

A2. The plug connector of example A1, wherein the housing comprises:

a shell comprising the first opening, the second opening and the at least one third opening; and a contact carrier inserted into the at least one third opening.

A3. The plug connector of example A2, wherein:

the plurality of terminals comprise intermediate portions interconnecting respective mating contact portions with respective contact tails; and the intermediate portions of the plurality of terminals are attached to the contact carrier.

A4. The plug connector of examples A2 or A3, wherein:

the contact carrier comprises a contact holder and a contact cover comprising at least one finger portion;

the plurality of terminals comprise intermediate portions interconnecting respective mating contact portions with respective contact tails, the intermediate portions comprising first and second sides, and wherein the terminals are mounted with the first sides against the contact holder over a first distance from an end of the terminals adjacent the contact tails; and the contact cover is mounted with the second sides of the intermediate portions against the contact cover over a second distance from the end of the terminals, the second distance being shorter than the first distance.

A5. The plug connector of any of examples A2-A4, wherein:

the at least one third opening is elongated in a first direction; and the contact carrier comprises an outer surface and the at least one third opening is bounded by an inner surface, facing the outer surface; and at least one of the outer surface and inner surface comprises a plurality of parallel ribs extending transverse to the first direction, wherein the plurality of ribs are configured to close off passage between the at least one third opening and the second opening.

A6. The plug connector of any of examples A4-A5, wherein:

the contact carrier comprises a contact holder and a contact cover, configured such that a channel between the contact holder and the contact cover extends in the first direction; and the shell comprises a second rib, extending in the first direction and extending into a groove.

A7. The plug connector of any of examples A1-A6, wherein the housing comprises one or more ribs extending into the second opening and placed in contact with an overmold material occupying at least a portion of the second opening.

B1. An apparatus comprising:

an electrical connector having an opening;

a plurality of mating contacts inserted through the opening of the electrical connector, each of the plurality of mating contacts having a mating contact portion, a contact tail, and an intermediate portion between the mating contact portion and the contact tail;

a contact holder disposed at least partially within the opening of the electrical connector and configured to support the plurality of mating contacts; and a contact cover disposed at least partially within the opening of the electrical connector such that at least one of the plurality of mating contacts is disposed between the contact holder and the contact cover;

wherein the intermediate portions comprise first and second sides, and wherein the mating contacts are mounted with the first sides against the contact holder over a first distance from an end of the mating contacts adjacent the contact tails; and the contact cover is mounted with the second sides of the intermediate portions against the contact cover over a second distance from the end of the mating contacts, the second distance being shorter than the first distance.

B2. The apparatus of example B1, wherein the contact cover comprises one or more projections, and wherein the second sides of the intermediate portions abut the one or more projections over the second distance from the end of the mating contacts.

B3. The apparatus of example B2, wherein at least one of the one or more projections comprises a first surface and a second surface opposite the first surface, the first surface being in contact with the second side of the intermediate portion and the second surface being in contact with an inner wall of the opening of the electrical connector.

B4. The apparatus of any of examples B1-B3, wherein the contact holder and the contact cover are separate pieces.

B5. The apparatus of example B1, wherein at least a portion of the intermediate portion is not in contact with the contact cover.

B6. The apparatus of any of examples B1-B5, wherein the mating contact comprises a convex surface adapted to electrically contact a pad formed in a mating connector.

B7. The apparatus of example B6, wherein the plurality of mating contacts includes at least a first mating contact and a second mating contact, and wherein the convex surface of the first mating contact faces a convex surface of the second mating contact.

B8. The apparatus of any of examples B1-B7, wherein the contact tail comprises a V-shaped mechanism for receiving a wire therein.

B9. The apparatus of any of examples B1-B8, wherein the electrical connector is configured to receive a cable therein.

B10. The apparatus of any of examples B1-B9, further comprising:

a cable comprising a plurality of conductive wires; and an insulative material;

wherein the opening is a first opening, and the electrical connector further comprises a second opening configured to receive a portion of a mating connector and a third opening configured to receive the cable, the first opening being disposed between the second opening and the third opening;

wherein the plurality of mating contacts extend through the first opening, the mating contact portions extend into the second opening and the contact tails extend into the third opening, wherein the plurality of conductive wires of the cable are electrically connected to the contact tails within the third opening; and wherein the insulative material is disposed within the third opening encapsulating the contact tails within the third opening and closing off passage between the first opening and the third opening.

B11. The apparatus of any of examples B1-B10, wherein the electrical connector is configured to be mated with an adapter connector such that, when mated, the electrical connector and the adapter connector are attached to a panel, wherein the apparatus further comprises:

a resilient member having first and second sealing elements, the resilient member being configured to form a first sealing interface with the panel and a second sealing interface with the electrical connector, the first and second sealing interfaces being orthogonal to each other, wherein the first sealing element is configured to engage with the panel and the second sealing element is configured to engage with the electrical connector.

C1. An adapter connector configured to be mated with a plug connector such that, when mated, the adapter connector and the plug connector are attached to a panel, the adapter connector comprising:

an insulative housing;

a first plurality of mating contacts supported by the insulative housing, the first plurality of mating contacts being configured to electrically contact a second plurality of mating contacts supported by the plug connector; and a resilient member having first and second sealing elements, the resilient member being configured to form a first sealing interface with the panel and a second sealing interface with the plug connector, the first and second sealing interfaces being orthogonal to each other, wherein the first sealing element is configured to engage with the panel and the second sealing element is configured to engage with the plug connector.

C2. The adapter connector of example C1, wherein the resilient member comprises a base and a sidewall configured to wrap around an outer border of the adapter connector.

C3. The adapter connector of example C2, wherein the first sealing element is disposed at the base and the second sealing element is disposed at the sidewall.

C4. The adapter connector of any of examples C1-C3, wherein the first sealing element extends in a direction that is parallel to a direction of mating of the adapter connector with the plug connector.

C5. The adapter connector of any of examples C1-C4, wherein the first sealing element comprises a rib configured to engage with a respective recess formed in the panel.

C6. The adapter connector of any of examples C1-C5, wherein the second sealing element comprises a rib configured to engage with a respective recess formed in the plug connector.

C7. The adapter connector of any of examples C1-C6, wherein the adapter connector is attached to the panel through a plurality of screws.

C8. The adapter connector of example C7, wherein the plurality of screws pass through respective openings formed in the resilient member.

C9. The adapter connector of any of examples C1-C8, wherein:

the insulative housing comprises a body having a top surface and an angled surface disposed at an edge of the top surface; and the first plurality of mating contacts extend through the top surface.

C10. The adapter connector of example C9, wherein:

the first sealing elements is positioned to form the first sealing interface with the panel; the second sealing element is positioned to form the second sealing interface with the plug connector;

the second sealing element has an upper edge; and the upper edge of the second sealing element is below the angled surface.

C11. The adapter connector of any of examples C1-C10, wherein:

the insulative housing comprises a slot; and the resilient member comprises a rib extending into the slot, and the slot and the rib each have an aspect ratio of at least 2:1.

D1. A resilient member configured to seal first and second electrical connectors attached to a panel, the resilient member comprising:

a base having an opening formed therethrough, the base being configured to form a first sealing interface with the panel;

a sidewall connected to the base, the sidewall being configured to form a second sealing interface with the second electrical connector;

a first sealing element extending from the base; and a second sealing element extending from the sidewall, wherein the first sealing interface and the second sealing interface are perpendicular to each other.

D2. The resilient member of example D1, wherein the base, the sidewall, and the first and second sealing elements are made of an elastic material.

D3. The resilient member of any of examples D1-D2, wherein the first sealing element and the sidewall extend in opposite directions.

D4. The resilient member of any of examples D1-D3, wherein the opening is a first opening, and wherein the resilient member further comprises a second opening, wherein the first sealing element is disposed along at least a portion of a perimeter of the second opening.

D5. The resilient member of any of examples D1-D3, wherein the first sealing element comprises a rib configured to engage with a respective recess formed in the panel.

D6. The resilient member of any of examples D1-D5, wherein the second sealing element comprises a rib configured to engage with a respective recess formed in the second electrical connector.

D7. The resilient member of any of examples D1-D6, further comprising a third sealing element extending from the base, wherein the first sealing element and the third sealing element form one or more pockets enclosed therebetween.

D8. The resilient member of example D7, wherein the one or more pockets surround the opening in a plane defined by the base.

D9. The resilient member of any of examples D1-D8, wherein the base is further configured to form a third sealing interface with the first connector, and wherein the resilient member further comprises a third sealing element extending from the base, the first and third sealing elements extending in opposite directions.

D10. The resilient member of any of examples D1-D9, further comprising a third sealing element extending from the base toward the opening.

E1. An electrical connector comprising:

a housing having an opening formed therethrough and a first rib extending into the opening;

a plurality of mating contacts inserted through the opening of the housing;

a contact holder disposed at least partially within the opening of the housing and configured to support the plurality of mating contacts, the contact holder comprising a second rib abutting a first wall of the opening; and a contact cover disposed at least partially within the opening of the housing such that at least one of the plurality of mating contacts is disposed between the contact holder and the contact cover, the contact cover comprising a third rib abutting the first wall of the opening;

wherein the second and third rib are longitudinally aligned with each other and form a discontinuity between each other, and wherein the first rib is disposed in the discontinuity.

E2. The electrical connector of example E1, wherein the housing is configured to receive a cable therein, the cable comprising at least one conductive wire configured to connect to the at least one of the plurality of mating contacts.

E3. The electrical connector of examples E1 or E2, wherein the contact holder and the contact cover are separate pieces.

E4. The electrical connector of any of examples E1-E3, wherein the plurality of mating contacts extend along a first direction, and the third rib extends along a second direction perpendicular to the first direction.

E5. The electrical connector of example E4, wherein the first rib extends in the first direction.

E6. The electrical connector of any of examples E1-E5, wherein:

the plurality of mating contacts comprise mating contact portions, contact tails and intermediate portions interconnecting the mating contact portions with the contact tails, the intermediate portions comprising first and second sides, and wherein the terminals are mounted with the first sides against the contact holder over a first distance from an end of the mating contacts adjacent the contact tails; and the contact cover is mounted with the second sides of the intermediate portions against the contact cover over a second distance from the end of the mating contacts, the second distance being shorter than the first distance.

E7. The electrical connector of any of examples E1-E6, wherein the electrical connector is configured to be mated with an adapter connector such that, when mated, the electrical connector and the adapter connector are attached to a panel, wherein the electrical connector further comprises:

a resilient member having first and second sealing elements, the resilient member being configured to form a first sealing interface with the panel and a second sealing interface with the housing, the first and second sealing interfaces being orthogonal to each other, wherein the first sealing element is configured to engage with the panel and the second sealing element is configured to engage with the housing.

F1. An panel connector configured to be attached to a board connector and to be mated with a plug connector such that, when mated, the panel connector and the plug connector are attached to a panel, the panel connector comprising:

an insulative housing comprising:

a mating interface configured for mating with the plug connector;

a mounting interface for mounting to the board connector, the mounting interface comprising a cavity configured to receive a portion of the board connector;

one or more projections formed at the mounting interface and configured to slide into respective one or more channels in the board connector; and a first plurality of mating contacts supported by the insulative housing, the first plurality of mating contacts being configured to electrically contact at the mating interface a second plurality of mating contacts supported by the plug connector.

F2. The panel connector of example F1, wherein the first plurality of mating contacts are arranged symmetrically with respect to a first axis that passes through a center of an interface between the panel connector and the board connector, and wherein the one or more projections are arranged asymmetrically with respect to the first axis.

F3. The panel connector of any of examples F1-F2, wherein the insulative housing comprises first and second housing portions supporting the first plurality of mating contacts, and an exterior housing encasing the first and second housing portions.

F4. The panel connector of any of examples F1-F3, further comprising:

a resilient member having first and second sealing elements, the resilient member being configured to form a first sealing interface with the panel and a second sealing interface with the plug connector, the first and second sealing interfaces being orthogonal to each other, wherein the first sealing element is configured to engage with the panel and the second sealing element is configured to engage with the plug connector.

F5. The panel connector of example F4, wherein the resilient member comprises a base and a sidewall configured to wrap around an outer border of the panel connector.

F6. The panel connector of any of examples F1-F5, wherein the insulative housing comprises a body having a top surface and an angled surface disposed at an edge of the top surface.

G1. A panel configured to be attached to a panel connector and to receive thereon a plug connector such that the plug connector electrically contacts the panel connector, the panel comprising:

a planar base;

an opening formed through the planar base and configured to receive the panel connector therethrough; and a raised portion formed on the planar base and surrounding the opening, the raised portion having a top surface that is vertically offset relative to a top surface of the planar base.

G2. The panel of example G1, further comprising the plug connector, wherein the plug connector comprises:

an insulative housing having a plurality of sidewalls forming a cavity configured to receive therein the raised portion of the panel, the plurality of sidewalls having respective slanted ends projecting outwardly relative to the insulative housing; and a first plurality of mating contacts supported by the insulative housing, the first plurality of mating contacts being configured to electrically contact a second plurality of mating contacts supported by the panel connector.

G3. The panel of example G2, wherein the insulative housing is sized such that the respective slanted ends are adjacent to the top surface of the planar base when the plug connector is received on the panel.

G4. The panel of any of examples G1-G3, further comprising a plurality of recesses formed on the top surface of the raised portion and configured to receive respective ribs of a seal, wherein the seal is configured to be disposed between the panel and the panel connector.

H1. A panel connector configured to be attached to a board connector and to be mated with a plug connector such that, when mated, the panel connector and the plug connector are attached to a panel, the panel connector comprising:

at least one housing portion;

an overmolded exterior housing encasing the at least one housing portion; and a first plurality of mating contacts supported by the at least one housing portion, the first plurality of mating contacts being configured to electrically contact a second plurality of mating contacts supported by the plug connector.

H2. The panel connector of example H1, wherein the at least one housing portion is a first housing portion, and further comprising a second housing portion, wherein the overmolded exterior housing encases the second housing portion, and wherein the first and second housing portions are manufactured separately.

H3. The panel connector of example H2, wherein the mating contacts extend along a first direction, and wherein the first and second housing portions are offset relative to each other along the first direction.

H4. The panel connector of any of examples H1-H3, wherein the at least one housing portion comprises a protrusion configured to engage with an opening formed on the overmolded exterior housing.

H5. The panel connector of any of examples H1-H4, wherein the at least one housing portion comprises a plurality of channels, wherein the first plurality of mating contacts pass through the plurality of channels.

H6. The panel connector of any of examples H1-H5, wherein the first plurality of mating contacts have respective ends that are supported by the overmolded exterior housing and are exposed in an exterior surface of the overmolded exterior housing.

I1. A method for manufacturing a panel connector configured to be attached to a board connector and to be mated with a plug connector such that, when mated, the panel connector and the plug connector are attached to a panel, the method comprising:

fabricating at least one housing portion using an insulative material;

inserting a plurality of mating contacts in the at least one housing portion; and fabricating an exterior housing by overmolding the at least one housing portion with the plurality of mating contacts inserted therein such that respective ends of the plurality of mating contacts are exposed in an exterior surface of the exterior housing.

I2. The method of example I1, wherein fabricating the at least one housing portion comprises forming a plurality of channels through the at least one housing portion, and wherein inserting the plurality of mating contacts in the at least one housing portion comprises:

passing the plurality of mating contacts through the plurality of channels.

I3. The method of any of examples I1-I2, wherein the at least one housing portion is a first housing portion, and wherein the method further comprises:

fabricating a second housing portion; and inserting the plurality of mating contacts in the second housing portion;

wherein fabricating the exterior housing further comprises overmolding the second housing portion.

I4. The method of any of examples I1-I3, wherein the plurality of mating contacts extend in a first direction, and wherein the first and second housing portions are offset relative to each other along the first direction.

I5. The method of any of examples I1-I4, wherein fabricating the exterior housing further comprises forming a cavity such that the plurality of mating contacts are placed at least partially in the cavity.

I6. The method of example I5, further comprising filling at least a portion of the cavity with a potting material.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A panel connector configured to be mated with a plug connector such that, when mated, the panel connector and the plug connector are attached to a panel, the panel connector comprising:

at least one housing portion;

an overmolded exterior housing encasing the at least one housing portion, wherein the exterior housing comprises a body portion and a widened portion; and a first plurality of mating contacts supported by the at least one housing portion, the first plurality of mating contacts having mating ends and tails opposite the mating ends, the mating ends being configured to electrically contact a second plurality of mating contacts supported by the plug connector, wherein the overmolded exterior housing is shaped so that the body portion passes through an opening of the panel with the widened portion being mounted on a first side of the panel, the mating ends being positioned on the first side of the panel and the tails being positioned on a second side of the panel opposite the first side.

2. The panel connector of claim 1, wherein the at least one housing portion is a first housing portion, and further comprising a second housing portion, wherein the overmolded exterior housing encases the second housing portion, and wherein the first and second housing portions are manufactured separately.

3. The panel connector of claim 2, wherein the mating contacts extend along a first direction, and wherein the first and second housing portions are offset relative to each other along the first direction.

4. The panel connector of claim 1, wherein the at least one housing portion comprises a protrusion configured to engage with an opening formed on the overmolded exterior housing.

5. The panel connector of claim 1, wherein the at least one housing portion comprises a plurality of channels, wherein the first plurality of mating contacts pass through the plurality of channels.

6. The panel connector of claim 1, wherein the mating ends are supported by the overmolded exterior housing and are exposed in an exterior surface of the overmolded exterior housing.

7. The panel connector of claim 6, wherein the first plurality of mating contacts are stamped to form respective shoulders and shafts, wherein the exposed ends are defined in the shoulders, and wherein the shoulders engage corresponding ledges formed in the at least one housing portion.

8. The panel connector of claim 1, wherein the at least one housing portion is a first housing portion, and further comprising a second housing portion, wherein the overmolded exterior housing encases the second housing portion, and wherein the first housing portion comprises a first protrusion configured to engage with the overmolded exterior housing and wherein the second housing portion comprises a second protrusion configured to engage with the overmolded exterior housing.

9. The panel connector of claim 1, further comprising a potting element, encased by the overmolded exterior housing, enclosing the first plurality of mating contacts.

10. The panel connector of claim 9, wherein the potting element is made of a silicon rubber or epoxy.

11. The panel connector of claim 9, wherein the potting element encloses the first plurality of mating contacts and forms an environmental seal around the first plurality of mating contacts within the overmolded exterior housing.

12. The panel connector of claim 1, further comprising a seal disposed between the widened portion of the exterior housing and the panel when the panel connector is attached to the panel.

13. The panel connector of claim 12, wherein the seal has an opening through which the first plurality of mating contacts passes.

14. The panel connector of claim 1, wherein the at least one housing portion is overmolded to the first plurality of mating contacts and forms an environmental seal around the first plurality of mating contacts within the overmolded exterior housing.

15. A method for manufacturing a panel connector configured to be mated with a plug connector such that, when mated, the panel connector and the plug connector are attached to a panel, the method comprising:

fabricating at least one housing portion using an insulative material;

inserting a plurality of mating contacts in the at least one housing portion; and fabricating an exterior housing by overmolding the at least one housing portion with the plurality of mating contacts inserted therein such that respective ends of the plurality of mating contacts are exposed in an exterior surface of the exterior housing, wherein overmolding the at least one housing portion comprises squeezing the plurality of mating contacts between metal of a mold and the at least one housing portion.

16. The method of claim 15, wherein fabricating the at least one housing portion comprises forming a plurality of channels through the at least one housing portion, and wherein inserting the plurality of mating contacts in the at least one housing portion comprises:

passing the plurality of mating contacts through the plurality of channels.

17. The method of claim 15, wherein the at least one housing portion is a first housing portion, and wherein the method further comprises:

fabricating a second housing portion; and inserting the plurality of mating contacts in the second housing portion;

wherein fabricating the exterior housing further comprises overmolding the second housing portion.

18. The method of claim 17, wherein the plurality of mating contacts extend in a first direction, and wherein the first and second housing portions are offset relative to each other along the first direction.

19. The method of claim 15, wherein fabricating the exterior housing further comprises forming a cavity such that the plurality of mating contacts are placed at least partially in the cavity.

20. The method of claim 19, further comprising filling at least a portion of the cavity with a potting material.

21. The method of claim 15, wherein inserting the plurality of mating contacts in the at least one housing portion comprises resting widened portions of the plurality of mating contacts on a ledge of the at least one housing portion.

22. The method of claim 15, wherein overmolding the at least one housing portion comprises resting ends of the plurality of mating contacts on a projection formed in the exterior housing.

* * * * *